United States Patent
Uchino et al.

(10) Patent No.: US 10,892,855 B2
(45) Date of Patent: Jan. 12, 2021

(54) TERMINAL AND COMMUNICATION SYSTEM

(71) Applicant: NTT DOCOMO, INC., Tokyo (JP)

(72) Inventors: Tooru Uchino, Tokyo (JP); Kazuki Takeda, Tokyo (JP); Kohei Kiyoshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/529,618

(22) PCT Filed: Jan. 27, 2016

(86) PCT No.: PCT/JP2016/052306
§ 371 (c)(1),
(2) Date: May 25, 2017

(87) PCT Pub. No.: WO2016/121809
PCT Pub. Date: Aug. 4, 2016

(65) Prior Publication Data
US 2017/0264398 A1      Sep. 14, 2017

(30) Foreign Application Priority Data

Jan. 29, 2015   (JP) .................................. 2015-015998

(51) Int. Cl.
*H04L 1/18*      (2006.01)
*H04W 8/24*      (2009.01)
(Continued)

(52) U.S. Cl.
CPC .............. *H04L 1/1812* (2013.01); *H04B 1/00* (2013.01); *H04L 1/16* (2013.01); *H04L 1/1822* (2013.01);
(Continued)

(58) Field of Classification Search
CPC .... H04L 1/1812; H04L 5/0055; H04W 28/04; H04W 72/0406; H04W 8/24
See application file for complete search history.

(56) References Cited

U.S. PATENT DOCUMENTS 8,473,799 B2 *   6/2013   Zhang ................... H04L 1/1822
                                                         370/315
9,497,682 B2 *   11/2016   Davydov .............. H04W 36/22
(Continued)

FOREIGN PATENT DOCUMENTS

JP      2012-508531 A      4/2012
JP      2013-085152 A      5/2013
(Continued)

OTHER PUBLICATIONS

International Search Report issued in PCT/JP2016/052306 dated Apr. 19, 2016 (5 pages).
(Continued)

*Primary Examiner* — Ajit Patel
(74) *Attorney, Agent, or Firm* — Osha Bergman Watanabe & Burton LLP

(57) ABSTRACT

There is provided a terminal for communicating with a base station apparatus, the terminal including a receiver that receives, from the base station apparatus, instruction information for performing an operation of an error correction process to be executed between the base station apparatus and the terminal, the instruction information including at least one of a process number of a process to be used for the error correction process, a time from receiving a signal until transmitting a reception response, and a timer value indicating a time from receiving the signal until receiving a retransmitted signal; and a processor that executes the error correction process based on the instruction information received by the receiver.

5 Claims, 14 Drawing Sheets

(51) Int. Cl.
| | |
|---|---|
| *H04L 1/16* | (2006.01) |
| *H04L 5/00* | (2006.01) |
| *H04L 5/14* | (2006.01) |
| *H04B 1/00* | (2006.01) |
| *H04W 28/04* | (2009.01) |
| *H04W 72/04* | (2009.01) |
| *H04L 27/00* | (2006.01) |
| *H04W 16/14* | (2009.01) |

(52) U.S. Cl.
CPC .......... *H04L 1/1854* (2013.01); *H04L 1/1864* (2013.01); *H04L 1/1896* (2013.01); *H04L 5/001* (2013.01); *H04L 5/0035* (2013.01); *H04L 5/1469* (2013.01); *H04W 8/24* (2013.01); *H04W 8/245* (2013.01); *H04W 28/04* (2013.01); *H04W 72/0406* (2013.01); *H04L 5/0055* (2013.01); *H04L 5/14* (2013.01); *H04L 27/0006* (2013.01); *H04W 16/14* (2013.01)

(56) References Cited

U.S. PATENT DOCUMENTS

| | | | | |
|---|---|---|---|---|
| 9,504,062 | B2* | 11/2016 | Bai | H04W 72/042 |
| 2007/0079207 | A1* | 4/2007 | Seidel | H04L 1/1845 |
| | | | | 714/748 |
| 2008/0188224 | A1* | 8/2008 | Pani | H04W 36/02 |
| | | | | 455/436 |
| 2010/0118723 | A1 | 5/2010 | Pani et al. | |
| 2010/0135221 | A1* | 6/2010 | Komura | H04L 1/1887 |
| | | | | 370/329 |
| 2011/0029833 | A1 | 2/2011 | Zhang et al. | |
| 2011/0044195 | A1* | 2/2011 | Wiemann | H04L 1/1874 |
| | | | | 370/252 |
| 2011/0292894 | A1* | 12/2011 | Wu | H04L 1/1812 |
| | | | | 370/329 |
| 2012/0120889 | A1* | 5/2012 | Cheng | H04L 1/1835 |
| | | | | 370/329 |
| 2012/0236815 | A1* | 9/2012 | Hu | H04L 1/1822 |
| | | | | 370/329 |
| 2013/0039202 | A1* | 2/2013 | Feuersanger | H04L 5/001 |
| | | | | 370/252 |
| 2013/0051341 | A1* | 2/2013 | Suzuki | H04L 1/1835 |
| | | | | 370/329 |
| 2013/0176981 | A1* | 7/2013 | Earnshaw | H04L 1/02 |
| | | | | 370/329 |
| 2014/0235256 | A1* | 8/2014 | Takeda | H04W 52/0216 |
| | | | | 455/450 |
| 2014/0286258 | A1* | 9/2014 | Chowdhury | H04L 1/1812 |
| | | | | 370/329 |
| 2014/0334375 | A1* | 11/2014 | Sugitani | H04W 84/20 |
| | | | | 370/315 |
| 2014/0362745 | A1 | 12/2014 | Davydov et al. | |
| 2015/0063180 | A1* | 3/2015 | Chen | H04L 1/1822 |
| | | | | 370/280 |
| 2015/0163740 | A1* | 6/2015 | Lee | H04W 76/048 |
| | | | | 370/311 |
| 2015/0237644 | A1* | 8/2015 | Golitschek | H04W 72/12 |
| | | | | 370/329 |
| 2015/0351092 | A1* | 12/2015 | Seo | H04L 5/0046 |
| | | | | 370/329 |
| 2016/0037322 | A1* | 2/2016 | Nguyen | H04W 76/14 |
| | | | | 370/329 |
| 2016/0205704 | A1* | 7/2016 | Aiba | H04W 72/04 |
| 2017/0163496 | A1* | 6/2017 | Januszewski | H04L 1/1822 |
| 2018/0167170 | A1* | 6/2018 | Kim | H04L 1/1822 |

FOREIGN PATENT DOCUMENTS

| | | |
|---|---|---|
| WO | 2013123980 A1 | 8/2013 |
| WO | 2014010901 A1 | 1/2014 |

OTHER PUBLICATIONS

Written Opinion of the International Searching Authority issued in PCT/JP2016/052306 dated Apr. 19, 2017 (5 pages).
3GPP TS 36.321 V12.4.0; "3rd Generation Partnership Project; Technical Specification Group Radio Access Network; Evolved Universal Terrestrial Radio Access (E-UTRA); Medium Access Control (MAC) protocol specification; (Release 12)"; Dec. 2014 (60 pages).
3GPP TSG-RAN WG1 Meeting #79; R1-144558; Ericsson; "Physical channel timing relationships for MTC"; San Francisco, USA; Nov. 17-21, 2014 (4 pages).
3GPP TSG-RAN WG1 Meeting #79; R1-144829; ZTE; "HARQ related issues for Licensed-assisted access using LTE"; San Francisco, USA; Nov. 17-21, 2014 (3 pages).
The partial supplementary European Search Report issued in corresponding European Application No. 16743412.5, dated Jan. 4, 2018 (19 pages).
ZTE; "Signalling to support CoMP with non-ideal backhaul"; 3GPP TSG-RAN WG1 Meeting #74bis, R1-134320; Guangzhou, China; Oct. 7-11, 2013 (6 pages).
InterDigital; "On Reduced UE Complexity for Rel-13 LC-MTC"; 3GPP TSG RAN WG1 Meeting #78bis, R1-144203; Ljubljana, Slovenia; Oct. 6-10, 2014 (3 pages).
Office Action issued in corresponding Japanese Patent Application No. 2016-572098, dated Apr. 10, 2018 (5 pages).
Extended European Search Report issued in corresponding European Patent Application No. 16743412.5, dated Apr. 25, 2018 (16 pages).
Office Action issued in corresponding Russian Application No. 2017125230, dated Oct. 18, 2018 (10 pages).
Office Action issued in corresponding Chinese Patent Application No. 201680007081.5, dated Dec. 3, 2019 (21 pages).
Office Action issued in corresponding Chinese Patent Application No. 201680007081.5, dated Jul. 7, 2020 (10 pages).

* cited by examiner

FIG.4A

DELAY INFORMATION

| eNB NUMBER | DELAY TIME | |
| --- | --- | --- |
| | eNB10b | eNB10c |
| eNB10a | 3ms | 6ms |

FIG.4B

TERMINAL INFORMATION

| TERMINAL TYPE IDENTIFIER | HARQ PROCESS NUMBER | ACK/NACK TRANSMISSION TIMING | HARQ RTT Timer |
| --- | --- | --- | --- |
| 111111 | 1 | 100s | 200s |
| 222222 | 2 | 50s | 100s |

FIG.4C

CA INFORMATION

| CA PATTERN | HARQ PROCESS NUMBER | ACK/NACK TRANSMISSION TIMING | HARQ RTT Timer |
|---|---|---|---|
| Pattern1 | TypeA | | |
| Pattern2 | TypeB | | |

FIG.4D

LAA BAND INFORMATION

| LAA BAND PATTERN | HARQ PROCESS NUMBER | ACK/NACK TRANSMISSION TIMING | HARQ RTT Timer |
|---|---|---|---|
| DOWNLINK: LTE UPLINK: WIRELESS LAN | 10 | 4ms | 12ms |

TERMINAL AND COMMUNICATION SYSTEM

TECHNICAL FIELD

The present invention relates to a terminal and a communication system.

BACKGROUND ART

For LTE (Long Term Evolution), in order to achieve highly reliable data transmission, an error correction technique has been used, which is referred to as a HARQ (Hybrid Automatic Repeat reQuest).

For a case where an error occurs in received data, the HARQ is a technique that allows to provide robust error resilience by saving the received data in a buffer, and by synthesizing retransmitted data and data saved in the buffer to restore the correct data.

For the LTE, error correction control using the HARQ is performed in a MAC (Medium Access Control) sublayer of a radio interface between an eNB (evolutional Node B) and a terminal (cf. Patent Document 1, for example).

For each cell, the eNB and the terminal are respectively provided with HARQ entities; and data is transmitted in the radio interface between the HARQ entity at the eNB side and the HARQ entity at the terminal side. Upon correctly receiving data, the HARQ entity receiving the data transmits an ACK (Acknowledgment) to the HARQ entity at the other side; and upon failing to correctly receive the data, a NACK (Negative Acknowledgement) is transmitted to the HARQ entity at the other side. The HARQ entity that receives the ACK transmits new data to the HARQ entity at the other side; and the HARQ entity that receives the NACK performs retransmission of data.

Further, an HARQ entity is operated by a plurality of HARQ processes. By operating the HARQ processes in parallel, the HARQ entity is able to transmit and receive different data items in parallel in consecutive subframes.

In the downlink, the minimum time for a predetermined HARQ process from transmitting (receiving) data to transmitting (receiving) new data or retransmitted data is referred to as a HARQ RTT Timer.

For a case of a FDD (Frequency Division Duplex) cell, it is specified that the HARQ RTT Timer is 8 subframes (8 ms); and that the HARQ processes number is 8 processes. For a case of a TDD (Time Division Duplex) cell, the HARQ RTT Timer is a number (k) that is predetermined for each TDD configuration (TDD Configuration) determined by a subframe ratio between the downlink and the uplink+4 subframes ((k+4) ms); and the HARQ process number is defined for each TDD configuration (TDD Configuration).

PRIOR ART DOCUMENT

Non-Patent Document

Patent Document 1: 3GPP TS36.321 V12.4.0 (2014 December)

SUMMARY OF INVENTION

Problem to be Solved by the Invention

However, for the current LTE, the HARQ process number and the HARQ RTT Timer are uniquely determined by the Duplex Mode (FDD or TDD) supported by the terminal, so that the HARQ operation is not able to be flexibly changed, for example, by the network setting.

FIGS. 1A through 1D are diagrams for describing a problem. By using FIGS. 1A through 1D, the problem is described, for example, for a case where carrier aggregation is performed in which a PCell (Primary Cell) and a SCell (Secondary Cell) are formed by different eNBs. In FIG. 1, it is assumed that the PCell and the SCell are FDD cells. Note that, for the carrier aggregation technology, it is specified that the ACK/NACK is transmitted through the PCell.

FIG. 1A illustrates a data flow for a case where carrier aggregation is performed with the same eNB 10. First, the eNB 10 transmits data to the terminal 20 by using the SCell (S1). Subsequently, the terminal 20 confirms whether received data is correctly received; and transmits, by using the PCell, a reception result (ACK/NACK) to the eNB 10 (S2). The eNB 10 determines, based on the reception result (ACK/NACK), whether new data is to be transmitted, or the data is to be retransmitted; and transmits the new data or the retransmitted data to the terminal 20 (S3). FIG. 1B is a diagram in which the data flow in FIG. 1A is shown in units of subframes. In accordance with the LTE specification, the terminal 20 transmits the ACK/NACK (S2) 4 ms after (four subframes after) receiving (S1) the data from eNB 10. Subsequently, the eNB 10 transmits the new data or the retransmitted data to the terminal 20 after 4 ms elapses from the reception of the ACK/NACK (S3). For a case of the FDD cell, the HARQ RTT Timer is 8 subframes (8 ms). Consequently, the eNB 10 transmits the new data or the retransmitted data to the terminal 20 (S3), after 8 ms elapses from transmitting the data (S1) to the terminal 20 (i.e., after 4 ms elapses from receiving the ACK/NACK).

FIG. 1C illustrates a data flow for a case where carrier aggregation is performed with different eNBs 10. The eNB 10b that forms the SCell transmits data to the terminal 20 by using the SCell (S4). Subsequently, the terminal 20 confirms whether the received data is correctly received; and transmits a reception result (ACK/NACK) to the eNB 10a that forms the PCell (S5). The eNB 10a transmits the reception result (ACK/NACK) to the eNB 10b (S6). The eNB 10b determines, based on the reception result (ACK/NACK), whether new data is to be transmitted, or the data is to be retransmitted; and transmits the new data or the retransmitted data to the terminal 20 (S7). FIG. 1D is a diagram that shows the data flow in FIG. 10 in units of subframes. Here, it is assumed that a propagation delay between the eNB 10a and the eNB 10b is 3 ms. The terminal 20 transmits the ACK/NACK (S5), 4 ms after (four subframes after) receiving the data from eNB 10b (S4). The eNB 10a transmits the ACK/NACK to the eNB 10b (S6). Subsequently, the eNB 10b transmits new data or the retransmitted data to the terminal 20, after 4 ms elapses from the reception of the ACK/NACK (S7).

Here, the eNB 10b transmits the new data or the retransmitted data to the terminal 20, after 4 ms elapses from receiving the ACK/NACK; however, since the propagation delay between the eNB 10a and the eNB 10b is 3 ms, it takes 11 ms to receive the new data or the retransmitted data at step S7, after receiving the data by the terminal 20 at step S4. As specified in the LTE specification, the HARQ process number of the terminal 20 is 8 processes, so that the eNB 10b is not able to continuously transmit data to the terminal for 8 or more subframes. Namely, in the subframes until 4 ms elapses from the reception of the ACK/NACK by the eNB 10b, the eNB 10b is unable to transmit data to the terminal 20, so that the data transmission efficiency is lowered.

The disclosed technology has been developed in view of the above description; and an object is to provide technology that allows a setting for an error correction process that is to be executed between a base station apparatus and a terminal to be flexibly changed.

Means for Solving the Problem

A terminal according to the disclosed technology is for communicating with a base station apparatus, the terminal including a receiver that receives, from the base station apparatus, instruction information for performing an operation of an error correction process to be executed between the base station apparatus and the terminal, the instruction information including at least one of a process number of a process to be used for the error correction process, a time from receiving a signal until transmitting a reception response, and a timer value indicating a time from receiving the signal until receiving a retransmitted signal; and a processor that executes the error correction process based on the instruction information received by the receiver.

Advantage of the Invention

According to the disclosed technology, a technique can be provided with which a setting for the error correction process to be executed between the base station apparatus and the terminal can be flexibly changed.

BRIEF DESCRIPTION OF DRAWINGS

FIG. 4A is a diagram illustrating an example of setting information according to the embodiment;
FIG. 4B is a diagram illustrating an example of the setting information according to the embodiment;
FIG. 4C is a diagram illustrating an example of the setting information according to the embodiment;
FIG. 4D is a diagram illustrating an example of the setting information according to the embodiment.

EMBODIMENTS OF THE INVENTION

Figure 1A:
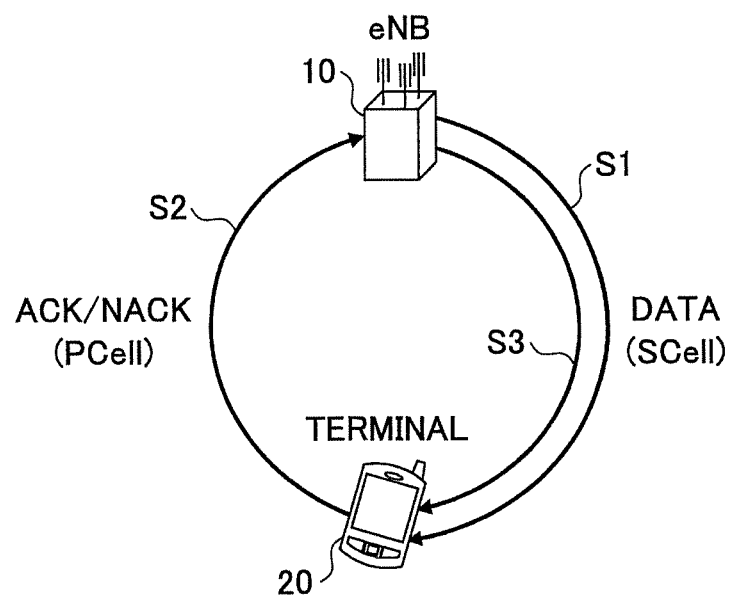
FIG. 1A is a diagram illustrating a problem.
Figure 1B:
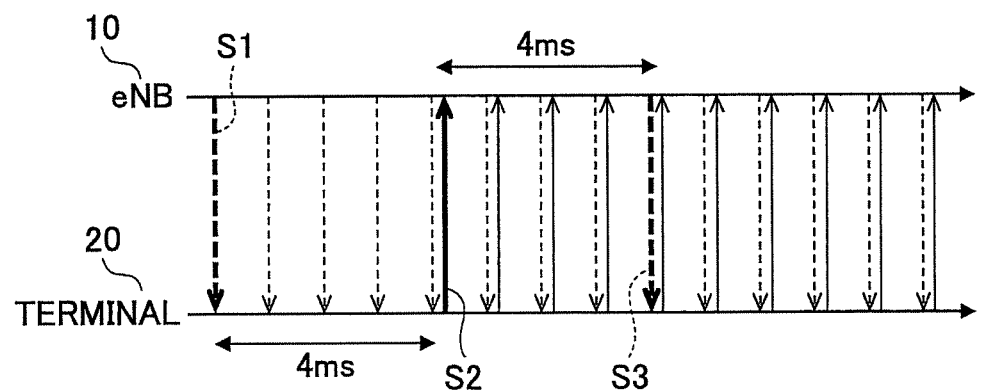
FIG. 1B is a diagram illustrating the problem.
Figure 1C:
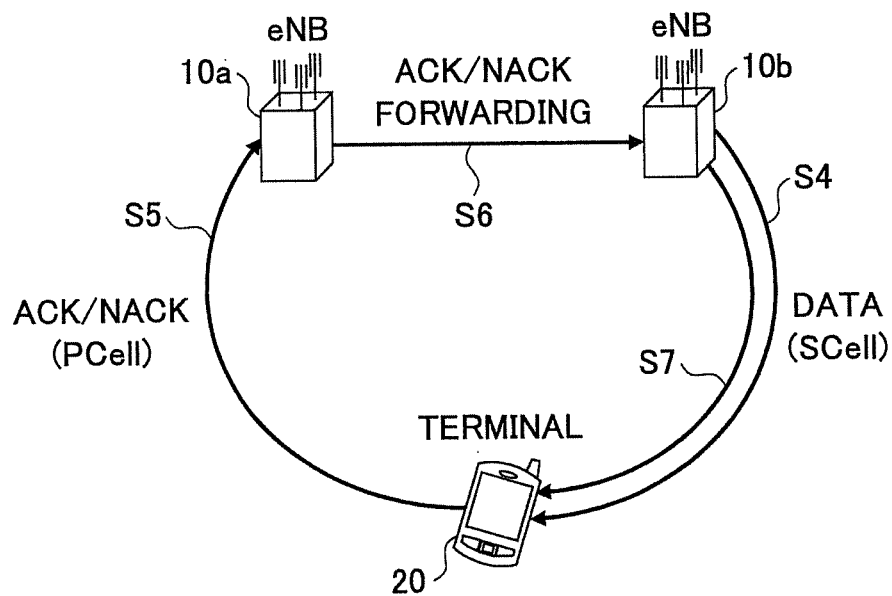
FIG. 1C is a diagram illustrating the problem.

An embodiment is described below by referring to the drawings. In the drawings, the same reference numerals may be attached to the same components, and thereby duplicate descriptions may be omitted. Note that the embodiment described below is merely an example, and embodiments to which the present invention is to be applied are not limited to the following embodiment. For example, a case is assumed where the LTE radio technology is used for the base station apparatus and the terminal described below; however, the present invention can be applied to a base station apparatus and a terminal that use radio technology other than the LTE.

<Overview>

Figure 2:
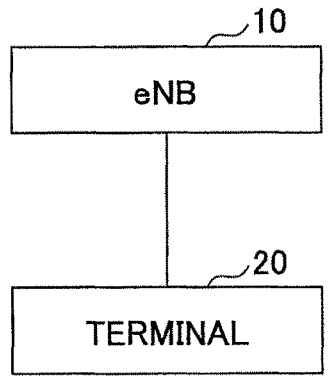
FIG. 2 is a diagram illustrating an overview of a communication system according to an embodiment.

FIG. 2 is a diagram illustrating an overview of a communication system according to the embodiment. The communication system according to the embodiment includes a base station apparatus (eNB 10) and a terminal 20.

The eNB 10 communicates with a terminal 20 through radio. The eNB 10 is formed of hardware resources, which are, for example, a CPU, such as a processor; a memory device, such as a ROM, a RAM, or a flash memory; an antenna for communicating with the terminal 20, and so forth; a communication interface device for communicating with a neighboring eNB 10, a core network, and so forth. Each of functions and processes of the eNB 10 may be implemented by processing or executing, by a processor, data and a program stored in a memory device. However, the eNB 10 is not limited to the above-described hardware configuration, and may include any other suitable hardware configuration.

The terminal 20 is provided with a function for communicating with the eNB 10, the core network, and so forth, through radio. The terminal 20 is, for example, a cellular phone, a smartphone, a tablet, a mobile router, or a wearable terminal. The terminal 20 may be any terminal, provided that the device includes a communication function. The terminal 20 is formed of hardware resources, which are, for example, a CPU, such as a processor; a memory device, such as a ROM, a RAM, or a flash memory; an antenna for communicating with the eNB 10, and so forth; and an RF (Radio Frequency) device. Each of functions and processes of the terminal 20 may be implemented by processing or executing, by a processor, data and a program stored in a memory device. However, the terminal 20 is not limited to the above-described hardware configuration, and may include any other suitable hardware configuration.

Upon receiving, from the eNB 10, an instruction for an operation of a HARQ task, the terminal 20 changes a HARQ process number, an ACK/NACK transmission timing, or a HARQ RTT Timer, based on the received instruction; and executes the HARQ task in accordance with the changed HARQ process number, ACK/NACK transmission timing, or HARQ RTT Timer. Similarly, the eNB 10 executes the eNB 10's own HARQ task, so that synchronization is achieved with the HARQ task according to the instruction to the terminal 20.

Additionally, the terminal 20 may signal a processing capability of the terminal 20 for the HARQ task to the eNB 10. The eNB 10 that receives signaling determines an operation of the HARQ task based on the processing capability of the terminal 20, and signals it to the terminal 20.

A number of data items that can be received in parallel by the HARQ entity is determined by the HARQ process number. Namely, as the HARQ process number at the receiving side becomes greater, the HARQ entity at the transmitting side can transmit data items in parallel by consecutive subframes, without waiting for the ACK/NACK feedback.

The ACK/NACK transmission timing is the duration for an HARQ process to receive data; to confirm whether an error occurs in the received data; and to feed back the ACK/NACK to the HARQ entity at the transmitting side.

The HARQ RTT Timer is, as described above, the minimum time for a predetermined HARQ process from transmitting (receiving) data until transmitting (receiving), subsequently, new data or the retransmitted data.

The communication system according to the embodiment can execute suitable HARQ processes corresponding to various types of communication methods by allowing the HARQ process number, the ACK/NACK transmission timing, or the HARQ RTT Timer to be changed to any number.

In the following description, the HARQ process number, the ACK/NACK transmission timing, and the HARQ RTT Timer may be collectively referred to as the "setting values of the HARQ task."

<Functional Configuration>
(eNB)

Figure 3:
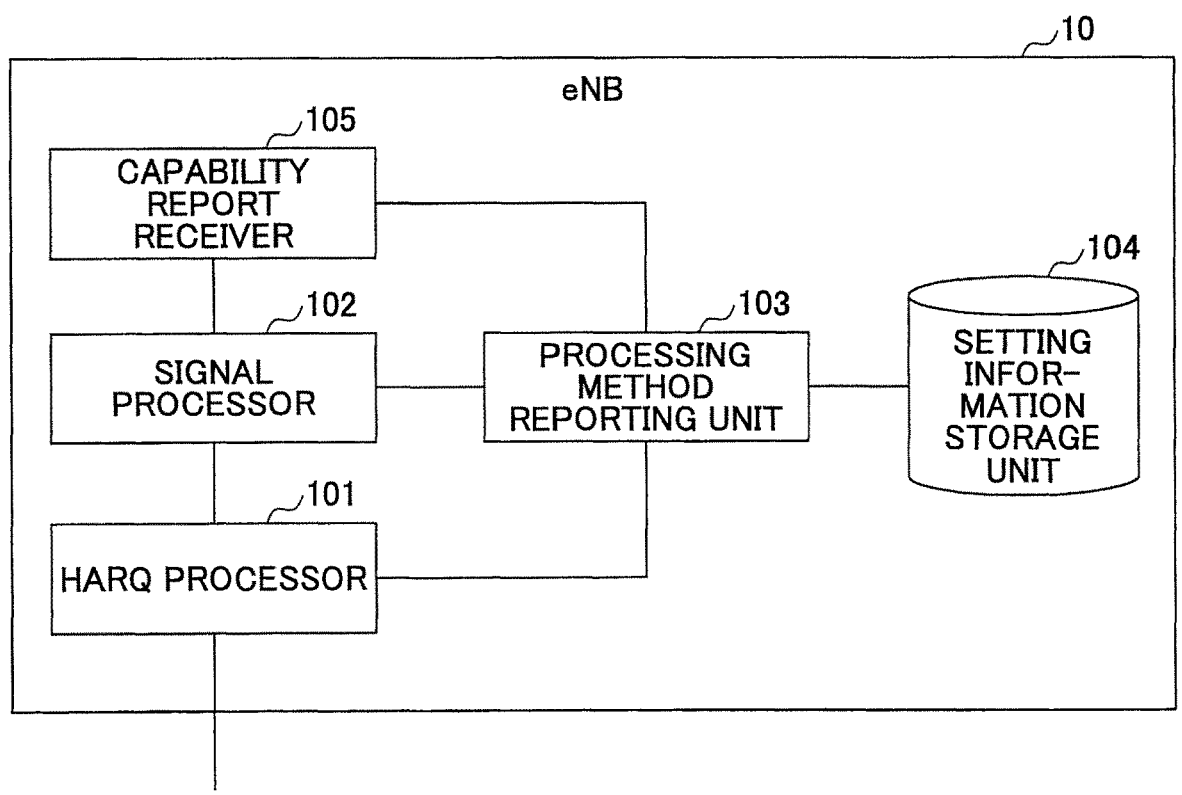
FIG. 3 is a diagram illustrating an example of a functional configuration of a base station apparatus according to the embodiment.

FIG. 3 is a diagram illustrating an example of a functional configuration of the base station apparatus according to the embodiment. Here, FIG. 3 only illustrates functional units that are particularly relevant to the embodiment of the present invention; and functions, which are not depicted, for implementing the overall functionality of the eNB 10 are also included. Further, the functional configuration illustrated in FIG. 3 is merely an example. The functional subdivision and the names of the functional units may be any subdivision and names, provided that operation according to the embodiment can be executed. Furthermore, only a part of the functions of the depicted functions may be included, provided that the operation according to the implementation of the present invention can be executed.

The eNB 10 includes a HARQ processor 101; a signal processor 102; a processing method reporting unit 103; and a setting information storage unit 104.

The HARQ processor 101 executes a HARQ task of a MAC sublayer for data transmitted and received between the eNB 10 and the terminal 20. Further, when the HARQ task at the terminal 20 side is changed, the HARQ processor 101 executes the HARQ task, so that synchronization with the HARQ task at the terminal 20 side can be achieved.

Note that, for a case where a number of data items received in parallel in consecutive subframes from the terminal 20 in uplink communication exceeds the HARQ process number, the HARQ processor 101 may discard the data received from the terminal without storing it in a buffer; or the HARQ processor 101 may discard the data that has already been stored in the buffer, and store the new data. The reason is that, as described above, the number of data items that can be received by the HARQ entity in parallel in consecutive subframes is determined by the HARQ process number.

The signal processor 102 executes protocol processing for a MAC sublayer, a RLC (Radio Link Control) sublayer, a PDCP (Packet Data Convergence Protocol) sublayer, and the RRC (Radio Resource Control), and executes a process of transferring user data.

The processing method reporting unit 103 determines operation of the HARQ task based on various types of setting information stored in the setting information storage unit 104; and instructs the terminal 20 to execute the HARQ task in accordance with the determined operation of the HARQ task. Additionally, the processing method reporting unit 103 determines operation of the HARQ task based on a processing capability reported from the terminal 20; and instructs the terminal 20 to execute the HARQ task in accordance with the determined operation of the HARQ task. Furthermore, the processing method reporting unit 103 reports the determined operation of the HARQ task to the HARQ processor 101, so that synchronization can be achieved between the operation of the HARQ task at the HARQ processor 101 and the operation of the HARQ task, execution of which is according to the instructions sent to the terminal 20.

Further, the processing method reporting unit 103 may independently order an operation of the HARQ task for the downlink communication and an operation of the HARQ task for the uplink communication.

Furthermore, for a case where the HARQ process by an HARQ processor 201 of the terminal 20 is to be changed, the processing method reporting unit 103 may execute a predetermined process for resetting buffers and various types of timer values maintained in the HARQ processor 201 of the terminal 20. For example, the specification of the 3GPP (3rd Generation Partnership Project) specifies that, for cases, such as a case of executing the intra-cell HO (Handover) and a case of deactivating the SCell, buffers and various types of timer values used for the HARQ task are to be reset once. Thus, the processing method reporting unit 103 may force the terminal 20 to execute an operation, such as the intra-cell HO or deactivation of the SCell, so that the buffers and the various types of timer values maintained by the HARQ processor 201 of the terminal 20 are caused to be reset.

The setting information storage unit 104 is implemented by a memory device, such as a ROM, a RAM, or a flash memory; and stores various types of setting information for determining operation of a HARQ process.

FIG. 4 is a diagram illustrating an example of setting information according to the embodiment. The setting information includes delay information; terminal information; CA (Carrier Aggregation) information; and LAA (Licensed Assisted Access using LTE) band information.

The delay information indicates delay time for transmitting a signal between two eNB 10s. FIG. 4A illustrates an example of the delay information. The delay information illustrated in FIG. 4A indicates that the delay time between the eNB 10a and the eNB 10b is 3 ms; and that the delay time between the eNB 10a and eNB 10c is 6 ms. As the delay information, a delay time that is measured in advance may be stored; or a measurement result may be stored that is obtained by periodical measurement, for example, by using the X2 interface, which is a communication interface between eNB 10s.

The terminal information defines, for each type of terminal, a setting value of an HARQ task corresponding to the type of the terminal 20. Recent years, a communication system has been focused on, which is for implementing various types of services by executing direct communication among a plurality of communication devices, which is called a MTC (Machine Type Communication). As for the communication devices used for the MTC, there are many devices, such as a smart meter, that handle only a small amount of data, and that are relatively tolerant of transmission delay of the data; instead, it is desirable to reduce power consumption for these devices. The terminal information is used for specifying setting values of HARQ tasks for these devices. The terminal information specifies, for each terminal type identifier for identifying a terminal type, a HARQ process number, ACK/NACK transmission timing, and a HARQ RTT Timer. For the terminal type identifier, for example, an IMEI (International Mobile Equipment Identify) may be used, or another identifier may be used.

The CA information is for defining, for each CA pattern, setting values of a HARQ task. The CA information defines, for each CA pattern, a HARQ process number, an ACK/NACK transmission timing, and a HARQ RTT Timer. A CA pattern is a pattern of a combination among a number of cells forming the CA, a duplex mode of each cell, and a duplex mode of the PCell.

Here, in the current 3GPP specification, the HARQ process number, the ACK/NACK transmission timing, and the HARQ RTT Timer are predetermined for each TDD configuration (TDD Configuration), which is determined by a subframe ratio between the downlink and the uplink. For example, for the TDD Configuration 1 for which the ratio of the subframes between the downlink and the uplink is 3:2, the downlink HARQ process number is 7, and the HARQ RTT Timer for each subframe is k+4 ms. Further, as the ACK/NACK transmission timing (k), different values are respectively defined for subframes; and it is specified that k=7 for subframe 0, k=6 for subframe 1, k=4 for subframe 4, k=7 for subframe 5, and k=6 for subframe 6.

In this manner, for a case of a TDD cell, the HARQ task is complicated unlike that for a FDD cell. Thus, for a HARQ task for CA where a FDD cell and a TDD cell are combined, the HARQ process number and the HARQ RTT Timer may be specified for each CA pattern and for each cell; and, additionally, the ACK/NACK transmission timing may be specified for each subframe of each cell. Here, the CA pattern may be any combination; or may correspond to the CA configuration specified by the 3GPP.

The example of FIG. 4C indicates, for example, that, for a case where the CA pattern is Pattern 1, the HARQ process number, the ACK/NACK transmission timing, and the HARQ RTT Timer of Type A are applied.

The LAA band information is for specifying the HARQ process number, the ACK/NACK transmission timing, and the HARQ RTT Timer for a case where communication using the LAA technology is to be performed. Note that the LAA technology is for allowing the LTE to be utilized for an unlicensed frequency (e.g., 5 GHz band used for the wireless LAN). The LAA technology is for permitting communication only for a case where no other communication is performed and only for a predetermined time period, so that interference with any other radio communication can be avoided. The predetermined time period is defined by a policy of each country and a frequency band (for example, for the frequency band of the wireless LAN, it is 4 ms).

Referring back to FIG. 3, the description is continued.

A capability report receiver 105 receives information on processing capability of the terminal 20 from the terminal 20; and passes it to the processing method reporting unit 103.

(Terminal)

Figure 5:
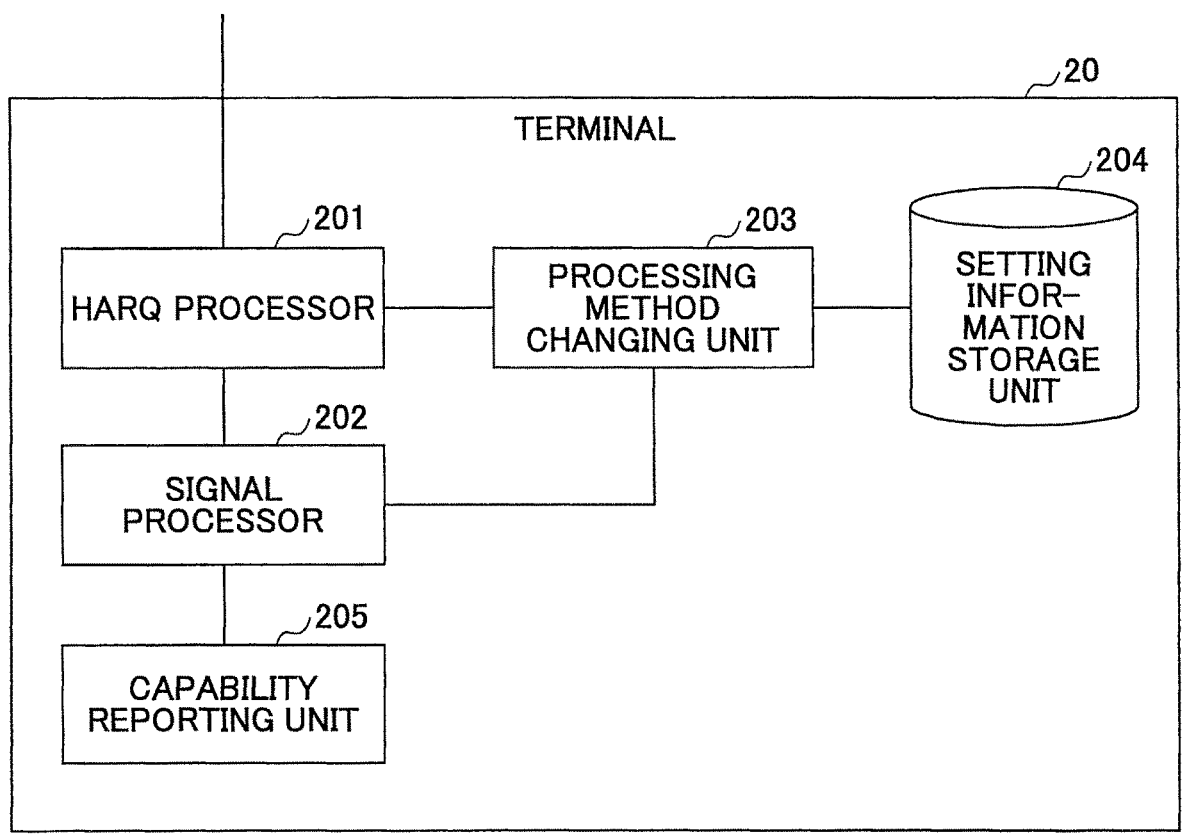
FIG. 5 is a diagram illustrating an example of a functional configuration of a terminal according to the embodiment.

FIG. 5 is a diagram illustrating an example of a functional configuration of the terminal according to the embodiment. Here, FIG. 5 only illustrates functional units that are particularly relevant to the embodiment of the present invention; and functions, which are not depicted, for implementing the overall functionality of the terminal 20 are also included. Further, the functional configuration illustrated in FIG. 5 is merely an example. The functional subdivision and the names of the functional units may be any subdivision and names, provided that operation according to the embodiment can be executed. Furthermore, only a part of the functions of the depicted functions may be included, provided that the operation according to implementation of the present invention can be executed.

The terminal 20 includes an HARQ processor 201; a signal processor 202; a processing method changing unit 203; a setting information storage unit 204; and a capability reporting unit 205.

The HARQ processor 201 executes, for data transmitted and received between eNB 10 and the terminal 20, a HARQ task of the MAC sublayer.

Further, for a case where operation of the HARQ task is changed by an instruction from the eNB 10, the HARQ processor 201 resets buffers and various types of timer values for executing the HARQ task. Additionally, for the case where operation of the HARQ task is changed by the instruction from the eNB 10, the HARQ processor 201 divides or combines the buffers depending on the HARQ process number selected by the eNB 10, so that the HARQ processes can execute the HARQ tasks, respectively. Additionally, for a case where the number of the CCs (Component Carriers) is to be changed (addition, deletion, activation, or deactivation of one or more SCells) for the CA, one or more HARQ entities are added or deleted depending on the number of the one or more CCs to be changed; and, at the same time, the buffers are divided or combined, so that the HARQ processes of HARQ entities can execute the HARQ tasks, respectively.

Note that, for a case where a number of data items received in parallel in consecutive subframes from the eNB 10 in downlink communication exceeds the HARQ process number, the HARQ processor 201 may discard the data received from the eNB 10 without storing it in a buffer, or may discard the data that has already been stored in the buffer to store the new data. The reason is that, as described above, the number of data items that can be received by the HARQ entity in parallel in consecutive subframes is determined by the HARQ process number.

The signal processor 202 executes protocol processing for the MAC sublayer, the RLC (Radio Link Control) sublayer, the PDCP (Packet Data Convergence Protocol) sublayer, and the RRC (Radio Resource Control), and executes a process of transferring user data.

The processing method changing unit 203 receives, from the eNB 10, an instruction for the operation of the HARQ task. Further, the processing method changing unit 203 reports the received instruction to the HARQ processor 201, so that the HARQ task to be executed by the HARQ processor 201 is caused to be changed.

Furthermore, the processing method changing unit 203 may search for a setting value of the HARQ task corresponding to the operation of the HARQ task selected by the eNB 10 in the setting information storage unit 204; and may report the retrieved setting value to the HARQ processor 201. Additionally, the processing method changing unit 203 may search for a setting value of the HARQ task corresponding to a state that can be recognized by the terminal 20 itself (e.g., the LAA band with which communication is performed, or a type of the terminal 20 itself) in the setting information storage unit 204; and may report the retrieved setting value to the HARQ processor 201.

Further, for causing the HARQ task of the HARQ processor 201 to be changed, the processing method changing unit 203 may execute a predetermined process for resetting buffers and various types of timer values maintained by the HARQ processor 201. For example, the processing method changing unit 203 may be forced to execute an operation, such as deactivation of the SCell, so that the buffers and the various types of timer values maintained by the HARQ processor 201 are caused to be reset.

Note that the various types of timers for executing the HARQ task may be, for example, the HARQ RTT Timer and the drx-retransmission Timer.

The setting information storage unit 204 is implemented, for example, by a memory device, such as a ROM, a RAM, or a flash memory; and stores various types of setting information for determining operation of the HARQ task. The setting information storage unit 204 stores, among the various types of setting information, the terminal information, the CA information, or the LAA band information, for example.

The capability reporting unit 205 reports, to the eNB 10, information on processing capability of the terminal 20 itself. The information on the processing capability of the terminal 20 itself is, for example, a maximum number of the HARQ process number that can be processed (can be maintained) by the terminal 20 itself; a minimum value of the ACK/NACK transmission timing that can be supported by the processing capability of the terminal 20 itself; and a minimum value of the HARQ RTT Timer that can be supported by the processing capability of the terminal 20 itself.

The capability reporting unit 205 may retrieve the HARQ process number, the ACK/NACK transmission timing, and the HARQ RTT Timer corresponding to the terminal type identifier of the terminal 20 itself from the terminal information in the setting information storage unit 204; or may use setting values that are fixedly stored in advance.

For the above-described eNB 10 and the terminal 20, the entire functional configuration may be implemented by a hardware circuit (e.g., one or more IC chips); or a part of the functional configuration may be formed of a hardware circuit, and the other part may be implemented by a CPU and a program.

(Base Station Apparatus)

Figure 6:
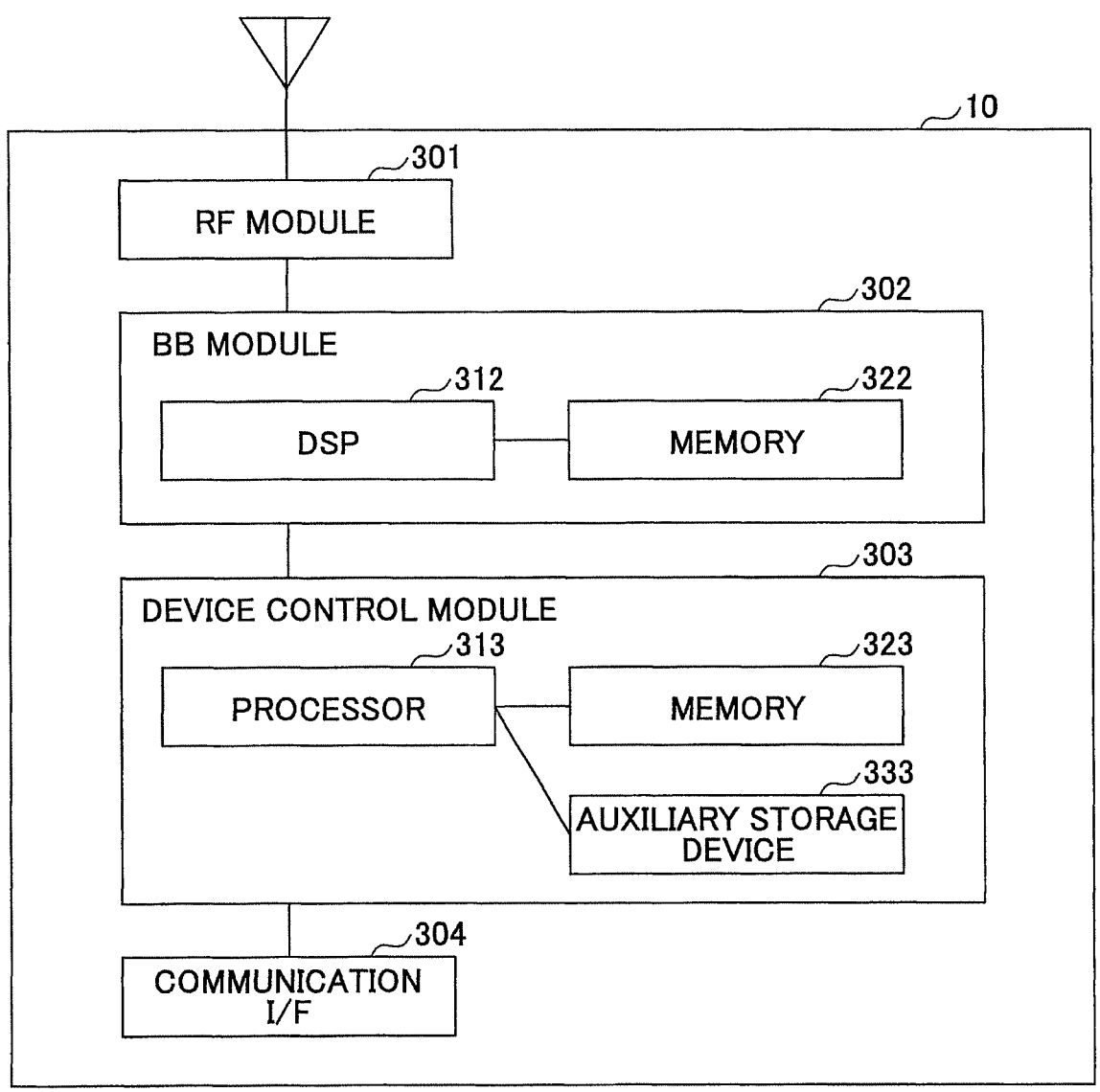
FIG. 6 is a diagram illustrating an example of a hardware configuration of the base station apparatus according to the embodiment.

FIG. 6 is a diagram illustrating an example of a hardware configuration of the base station apparatus according to the embodiment. FIG. 6 illustrates a configuration that is closer to implementation, compared to FIG. 3. As illustrated in FIG. 6, the eNB 10 includes an RF (Radio Frequency) module 301 that executes a process related to a radio signal; a BB (Base Band) processing module 302 that executes baseband signal processing; a device control module 303 that executes a process of, for example, an upper layer; and a communication IF 304 that is an interface for connecting to a network.

The RF module 301 generates a radio signal to be transmitted from an antenna by executing, for example, a D/A (Digital-to-Analog) conversion; modulation; a frequency conversion; power amplification; and so forth to a digital baseband signal received from the BB processing module 302. Additionally, a digital baseband signal is generated by applying a frequency conversion, an A/D (Analog to Digital) conversion, demodulation, and so forth to a received radio signal; and it is passed to the BB processing module 302.

The BB processing module 302 executes a process of mutually converting an IP packet and a digital baseband signal. A DSP (Digital Signal Processor) 312 is a processor that executes signal processing in the BB processing module 302. A memory 322 is used as a work area of the DSP 312. The BB processing module 302 includes, for example, the HARQ processor 101, the signal processor 102, and a part of the processing method reporting unit 103, which are illustrated in FIG. 3.

The device control module 303 executes protocol processing of an IP layer; OAM (Operation and Maintenance) processing, and so forth. A processor 313 is the processor that executes a process to be executed by the device control module 303. A memory 323 is used as a work area of the processor 313. The auxiliary storage device 333 is, for example, a HDD; and stores various types of setting information and so forth, which are for operating the eNB 10 itself. The device control module 303 includes, for example a part of the processing method reporting unit 103, the setting information storage unit 104, and the capability report receiver 105, which are illustrated in FIG. 3.

(Terminal)

Figure 7:
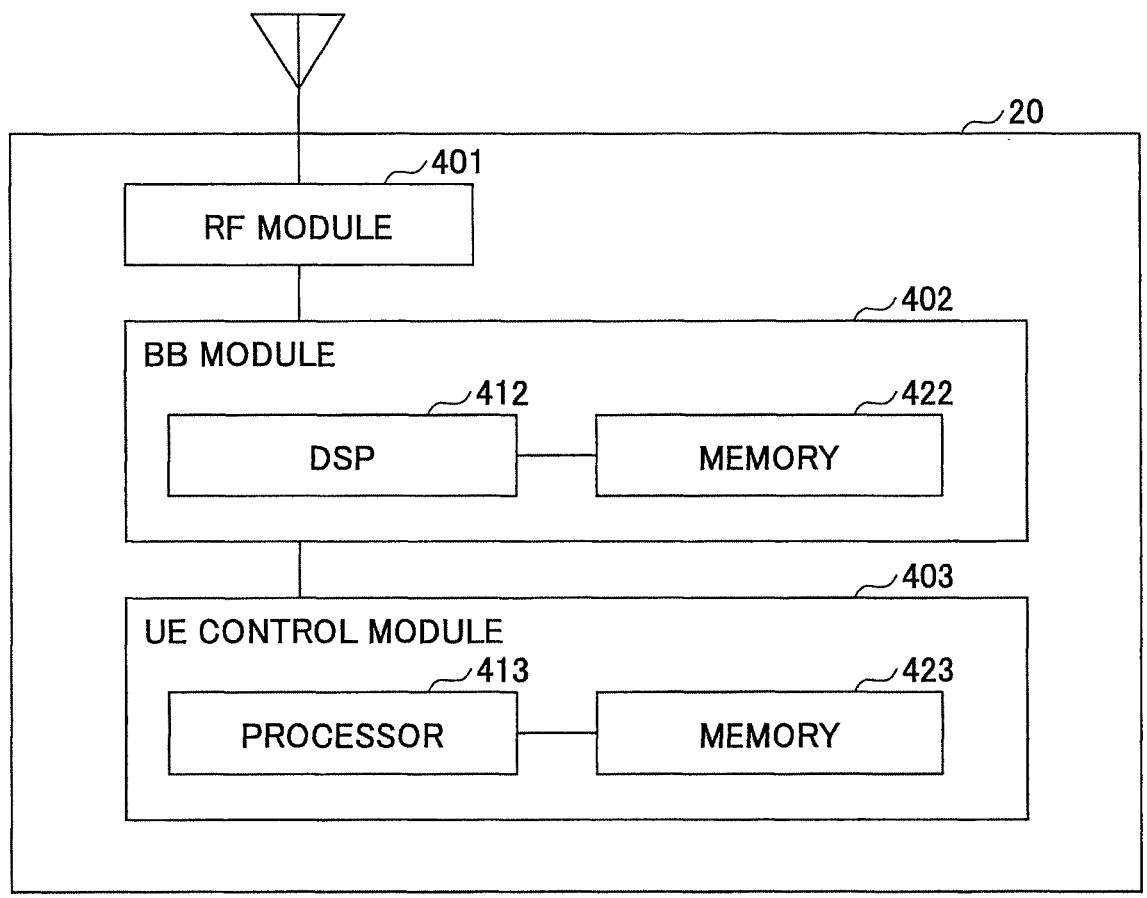
FIG. 7 is a diagram illustrating an example of a hardware configuration of the terminal according to the embodiment.

FIG. 7 is a diagram illustrating an example of a hardware configuration of the terminal according to the embodiment. FIG. 7 illustrates a configuration that is closer to implementation, compared to FIG. 5. As illustrated in FIG. 7, the terminal 20 includes an RF module 401 that executes a process related to a radio signal; a BB processing module 402 that executes baseband signal processing; and a UE control module 403 that executes a process of, for example, an upper layer.

The RF module 401 generates a radio signal to be transmitted from an antenna by executing a D/A conversion; modulation; a frequency conversion; power amplification, and so forth to a digital baseband signal received from the BB processing module 402. Additionally, a digital baseband signal is generated by applying a frequency conversion, an A/D conversion, demodulation, and so forth to a received radio signal; and it is passed to the BB processing module 402.

The BB processing module 402 executes a process of mutually converting an IP packet and a digital baseband signal. A DSP (Digital Signal Processor) 412 is a processor that executes signal processing in the BB processing module 402. A memory 422 is used as a work area of the DSP 412. The BB processing module 402 includes, for example, the HARQ processor 201, the signal processor 202, and a part of the processing method changing unit 203, which are illustrated in FIG. 5.

The UE control module 403 executes protocol processing of an IP layer, processing of various applications, and so forth. A processor 413 is the processor that executes a process to be executed by the UE control module 403. A memory 423 is used as a work area of the processor 413. The UE control module 403 includes, for example, a part of the processing method changing unit 203, the setting information storage unit 204, and the capability reporting unit 205, which are illustrated in FIG. 5.

<Processing Procedure>

Next, a processing procedure of the communication system according to the embodiment is described. Note that, unless as otherwise indicated, each operation example is described by assuming a case where setting values of an HARQ process in downlink communication are to be changed. Note that the operation examples can also be applied to a case where setting values of a HARQ task in uplink communication are to be changed.

Operation Example 1

Figure 8:
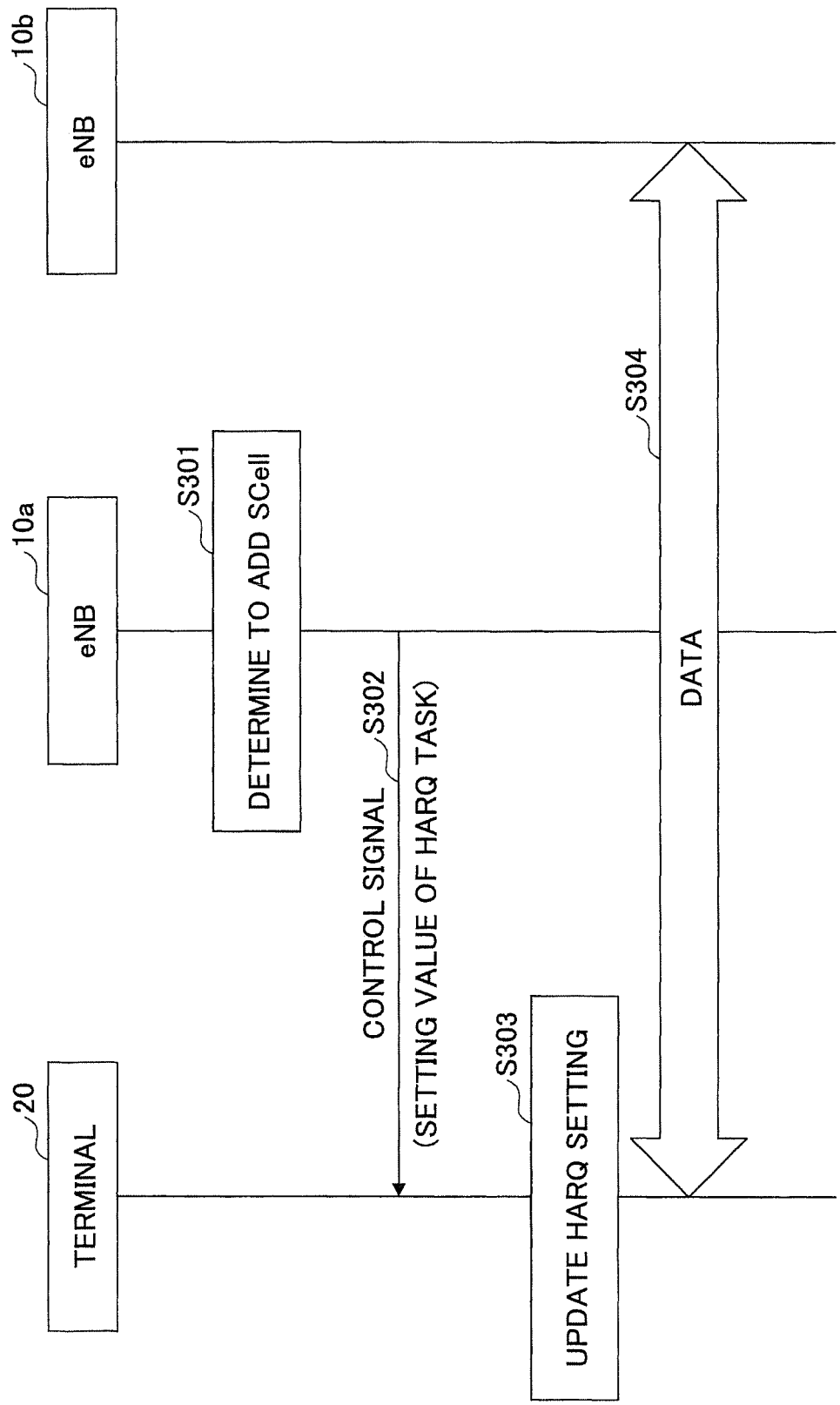
FIG. 8 is a diagram illustrating an example of a processing sequence of a processing procedure (operation example 1) according to the embodiment.

FIG. 8 is a diagram illustrating an example of a processing sequence of a processing procedure (operation example 1) according to the embodiment. By using FIG. 8, a processing sequence is described for a case where carrier aggregation is performed such that the PCell and the SCell are formed respectively by different eNB 10s. Note that the network configuration in the operation example of FIG. 8 is the same as the network configuration illustrated in FIG. 10. Namely, the eNB 10a forms the PCell, and the eNB 10b forms the SCell. Furthermore, it is assumed that the PCell and the SCell are FDD cells.

At step S301, the eNB 10a determines, based on the SCell candidate cells reported from the terminal 20, the SCell with which CA is to be performed. Here, it is assumed that the eNB 10a determines to add the SCell that is formed by the eNB 10b. The processing method reporting unit 103 of the eNB 10a refers to delay information in the setting information storage unit 104; and extracts the delay information between the eNB 10a and the eNB 10b. Subsequently, the processing method reporting unit 103 determines setting values of an HARQ process to be reported to the terminal 20.

For example, since the delay time between the eNB 10a and the eNB 10b is 3 ms, the processing method reporting unit 103 determines 11 processes, which is obtained by adding 3 processes to the HARQ process number (8 processes) for the usual FDD cell, as the HARQ process number to be reported to the terminal 20. Further, the processing method reporting unit 103 determines to leave the ACK/NACK transmission timing to be 4 ms, which is the specified value for the usual FDD cell. Furthermore, the processing method reporting unit 103 determines 11 ms, which is obtained by adding the delay time 3 ms between the eNB 10a and the eNB 10b to the usual HARQ RTT Timer (8 ms), as the HARQ RTT Timer to be reported to the terminal 20.

Note that the above-described determination method is merely an example. At step S301 of the processing procedure, the HARQ process number, the ACK/NACK transmission timing, and the HARQ RTT Timer to be reported to the terminal 20 may be determined by another method.

At step S302, the signal processor 102 of the eNB 10a transmits a control signal including the setting values of the HARQ task to the terminal 20. The control signal may be, for example, a signal used for the RRC protocol; a signal used for the MAC sublayer; or a signal used for the physical layer.

Furthermore, after transmitting the control signal including the setting values of the HARQ process at step S302, the signal processor 102 may instruct the terminal 20 to execute the intra-cell HO, so that buffers and various types of timer values maintained by the HARQ processor 201 of the terminal 20 are caused to be reset. In this case, the signal processor 102 instructs the terminal 20 in such a manner that the HO is to be executed for the cell that is the same as the cell to which the terminal 20 is currently connected.

At step S303, the processing method changing unit 203 of the terminal 20 reports, to the HARQ processor 201, the setting values of the HARQ process reported at step S302. The HARQ processor 201 of the terminal 20 updates the HARQ process number, the ACK/NACK transmission timing, and the HARQ RTT Timer based on the reported setting values of the HARQ task.

Further, the HARQ processor 201 divides buffers depending on the updated HARQ process number, so that the HARQ processes can execute HARQ tasks, respectively. Furthermore, one or more HARQ entities are added depending on a number of one or more established/activated CCs; and, at the same time, buffers are divided, so that the HARQ processes in each HARQ entity can execute HARQ tasks, respectively. Furthermore, prior to starting the HARQ tasks based on the HARQ process number, the ACK/NACK transmission timing, and the HARQ RTT Timer, which are updated, the HARQ processor 201 resets buffers and various types of timer values for executing the HARQ tasks.

Here, the process for resetting the buffers and various types of timer values for executing the HARQ tasks may be executed by the HARQ processor 201 itself; or the existing operational procedure to be executed for the intra-cell HO may be applied to execute the process.

At step S304, data transmission and ACK/NACK reporting are executed among the terminal 20, the eNB 10a, and the eNB 10b. As described in FIG. 10, the ACK/NACK for the data transmitted from the eNB 10b is transmitted to the eNB 10b through the eNB 10a, which forms the PCell.

Figure 9:
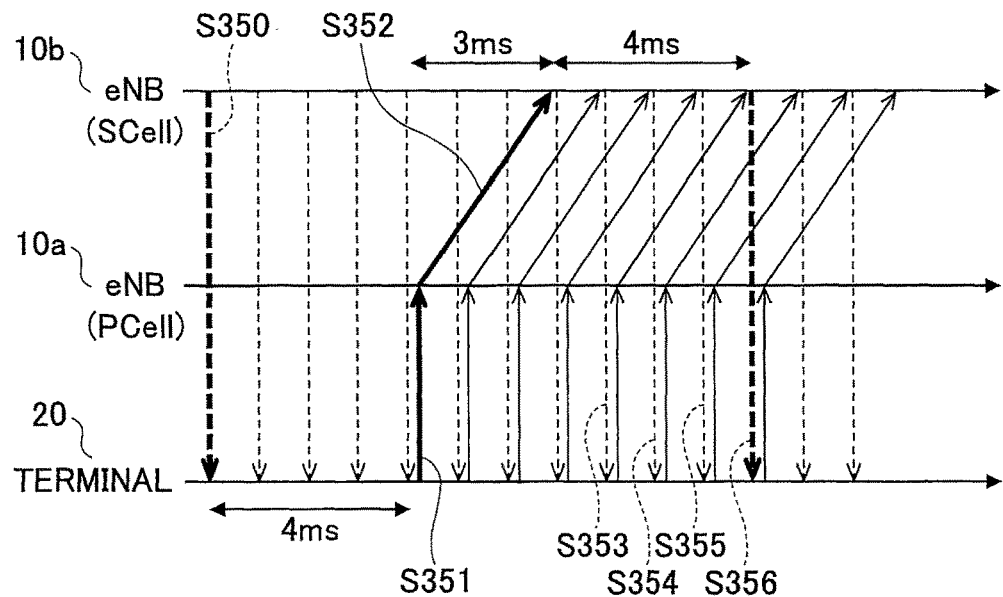
FIG. 9 is a diagram, in units of subframes, of a data flow of the processing procedure (operation example 1) according to the embodiment.

FIG. 9 is a diagram embodying, in units of subframes, a data flow of the processing procedure (operation example 1) according to the embodiment. FIG. 9 illustrates an example of a data flow for a case where the eNB 10a instructs the terminal 20 to execute the HARQ task with the HARQ process number=11 processes, the ACK/NACK transmission timing=4 ms, and the HARQ RTT Timer=11 ms.

Since the ACK/NACK transmission timing is set to be 4 ms, the terminal 20 transmits the ACK/NACK to the eNB 10a (S351) 4 ms after receiving the data from the eNB 10b (S350). Subsequently, the eNB 10a transmits, to the eNB 10b, the ACK/NACK received from the terminal 20 (S352). Here, since the delay time between the eNB 10a and the eNB 10b is 3 ms, the ACK/NACK transmitted from the terminal 20 reaches the eNB 10b in the subframe 3 ms after the subframe with which the terminal 20 has transmitted the ACK/NACK. Subsequently, since the HARQ RTT Timer is 11 ms, the eNB 10b transmits new data or the retransmitted data to the terminal 20 (S356) 11 subframes after transmitting the data to the terminal 20 (S350).

Figure 1D:
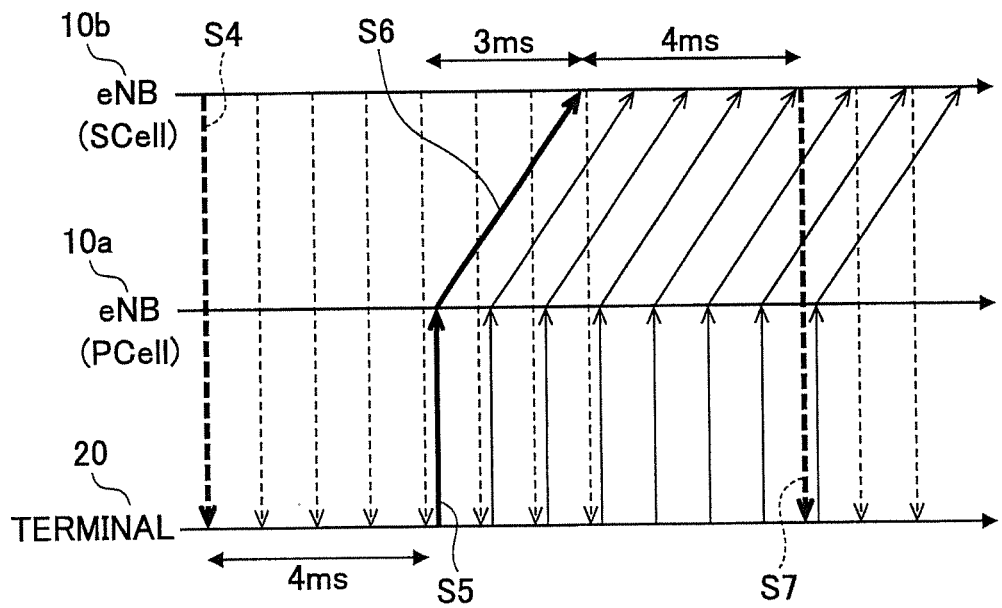
FIG. 1D is a diagram illustrating the problem.

Here, since the HARQ process number at the side of the terminal 20 is set to be 11, the eNB 10b can transmit any other data to the terminal 20 within 10 subframes from transmitting the data to the terminal 20 at step S350 until transmitting the new data or the retransmitted data to the terminal 20 at step S356. In the example of FIG. 1D, no other data can be transmitted within the interval from receiving, by the eNB 10b, the ACK/NACK from the eNB 10a (S6) until transmitting the new data or the retransmitted data to the terminal 20 (S7). However, in the example of FIG. 9, the eNB 10b is able to transmit any other data (S353-S355) to the terminal 20 within the interval from receiving, by the eNB 10b, the ACK/NACK from the eNB 10a (S352) until transmitting the new data or the retransmitted data to the terminal 20 (S356).

The processing procedure (operation example 1) according to the embodiment is described above. By executing the processing procedure of operation example 1, even if there exists a transmission delay between two eNB 10s, communication can be efficiently executed by updating the setting values of the HARQ process of the terminal 20. Furthermore, by doing this, the throughput between the eNB 10 and the terminal 20 can be enhanced.

Operation Example 2

Figure 10:
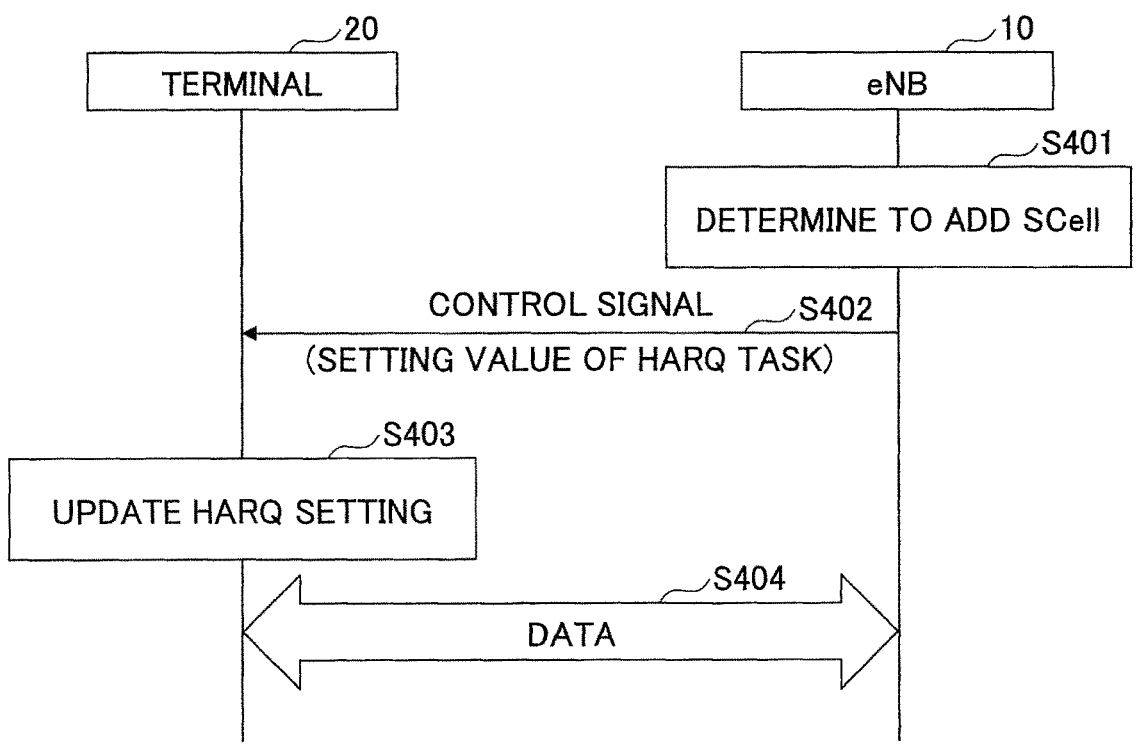
FIG. 10 is a diagram illustrating an example of a processing sequence of a processing procedure (operation example 2) according to the embodiment.
Figure 11:
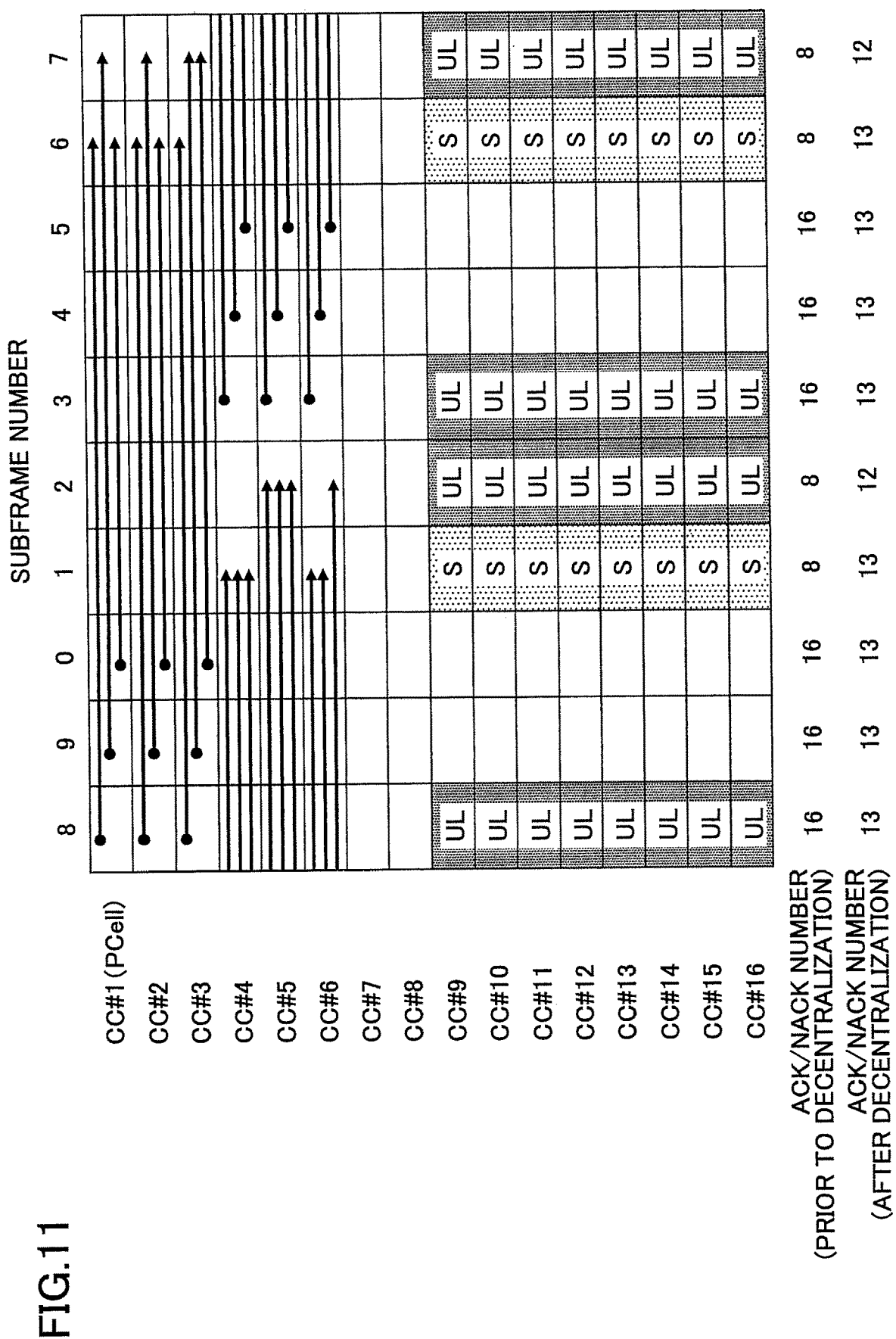
FIG. 11 is a diagram illustrating an example of a subframe configuration of the processing procedure (operation example 2) according to the embodiment.

FIG. 10 is a diagram illustrating an example of a processing sequence of a processing procedure (operation example 2) according to the embodiment. FIG. 11 is a diagram illustrating an example of a subframe configuration of the processing procedure (operation example 2) according to the embodiment. By using FIG. 10 and FIG. 11, the processing procedure is described, for example, for a case where CA is performed with 8 FDD cells and 8 TDD cells. Here, it is assumed that the PCell is a FDD cell. Namely, it is assumed that the ACK/NACK is transmitted in the FDD cell.

At step S401, the eNB 10 determines SCells with which the CA is to be performed, based on SCell candidate cells reported from the terminal 20. Here, it is assumed that the eNB 10 determines to perform the CA with the configuration illustrated in FIG. 11. Here, it is assumed that the CA with the configuration illustrated in FIG. 11 corresponds to Pattern 1 of the CA patterns in FIG. 4C.

The processing method reporting unit 103 of the eNB 10 refers to the CA information in the setting information storage unit 104; and determines the setting values of the HARQ task to be reported to the terminal 20.

At step S402, the signal processor 102 of the eNB 10 transmits a control signal including the setting values of the HARQ task to the terminal 20. The control signal may be, for example, a signal used for the RRC protocol; a signal used for the MAC sublayer; or a signal used for the physical layer.

Here, the signal processor 102 may instruct the terminal 20 to deactivate and activate any SCell after transmitting, to the terminal 20, the control signal including the setting values of the HARQ task at step S402, so that buffers and various types of timer values maintained by the HARQ processor 201 of the terminal 20 are caused to be reset.

At step S403, the processing method changing unit 203 of the terminal 20 reports, to the HARQ processor 201, the setting values of the HARQ task reported at step S402. The HARQ processor 201 of the terminal 20 updates the HARQ process number, the ACK/NACK transmission timing, and the HARQ RTT Timer, based on the reported setting values of the HARQ task.

Further, the HARQ processor 201 divides buffers depending on the updated HARQ process number, so that the HARQ processes can execute HARQ tasks, respectively. Furthermore, one or more HARQ entities are added depending on a number of one or more established/activated CCs; and, at the same time, buffers are divided, so that the HARQ processes in each HARQ entity can execute HARQ tasks, respectively. Furthermore, prior to starting the HARQ tasks based on the HARQ process number, the ACK/NACK transmission timing, and the HARQ RTT Timer, which are updated, the HARQ processor 201 resets buffers and various types of timer values for executing the HARQ tasks.

Here, the process for resetting the buffers and various types of timer values for executing the HARQ tasks may be executed by the HARQ processor 201 itself; or an existing operational procedure that is executed by deactivating and activating any SCell may be applied to execute the process. Furthermore, the HARQ processor 201 of the terminal 20 may deactivate and activate any SCell by itself.

At step S404, data transmission and ACK/NACK reporting are executed between the terminal 20 and the eNB 10.

Here, the HARQ process number, the ACK/NACK transmission timing, and the HARQ RTT Timer in this operation example are complicated, so that the data size of the control signal in the processing procedure at step S402 may be large. Thus, in the processing procedure at step S402, the control signal may only include an identifier, such as Type A, as illustrated in the CA information of FIG. 4C, for example. In this case, the terminal 20 refers to the CA information stored in the setting information storage unit 204 while using the specified identifier as a key; and determines the HARQ process number, the ACK/NACK transmission timing, and the HARQ RTT Timer.

Here, by using FIG. 11, an example is described for a case where a payload size of the PUCCH is reduced by updating the ACK/NACK transmission timing in the HARQ task for a case of performing CA with 8 FDD cells and 8 TDD cells. Here, it is assumed that CC#1 through CC#8 are the FDD cells, and CC#9 through CC#16 are the TDD cells.

Furthermore, it is assumed that CC#9 through CC#16 are TDD cells with TDD Configuration 1. Namely, in CC#9 through CC#16, subframes 0, 4, 5, and 9 are DL (downlink) subframes; subframes 1 and 6 are special subframes; and subframes 2 and 3 are UL (uplink) subframes.

Furthermore, in each subframe, the terminal 20 transmits the ACK/NACK to the eNB 10 through the FDD cell for UL.

As illustrated in FIG. 11, for subframes 0, 1, 4-6, and 9, all CCs are for DL subframes, respectively, so that the terminal 20 receives up to 16 pieces of data from the eNB 10. In contrast, for subframes 2, 3, 7, and 8, the TDD cells CC#9 through CC#16 are for UL subframes, respectively. Consequently, for subframes 2, 3, 7, and 8, the terminal 20 receives up to only 8 pieces of data from the eNB 10.

For a case where the ACK/NACK transmission timing is 4 ms, the terminal 20 returns 8 ACK/NACKs to the eNB 10 for subframes 1, 2, 6, and 7; and the terminal 20 returns 16 ACK/NACKs to the eNB 10 for subframes 0, 3, 4, 5, 8, and 9, as illustrated in FIG. 11.

In this manner, for a case of performing CA in which FDD cells and TDD cells coexist, the number of ACK/NACKs varies for each subframe. The ACK/NACKs are transmitted from the terminal 20 to the eNB 10 by using the PUCCH; however, a size of the field for storing the ACK/NACKs (PUCCH Payload) is predetermined. Accordingly, for a case where up to 16 ACK/NACKs are stored in the PUCCH payload of each subframe, a possibility increases, depending on a radio condition, that not all the ACK/NACKs are correctly reported to the eNB 10 (the error rate increases). Thus, it is desirable to distribute the ACK/NACKs between subframes in an averaged manner.

Specifically, for example, for CC#1 and CC#2, the ACK/NACK transmission timings for subframes 8 and 9 are set to be 8 ms later; and the ACK/NACK transmission timing for subframe 0 is set to be 6 ms later. Additionally, for CC#3, the ACK/NACK transmission timings for subframes 8 and 9 are set to be 8 ms later; and the ACK/NACK transmission timing for subframe 0 is set to be 7 ms later.

Additionally, for CC#4, the ACK/NACK transmission timing for subframe 3 is set to be 8 ms later; the ACK/NACK transmission timing for subframe 4 is set to be 7 ms later; and the ACK/NACK transmission timing for subframe 5 is set to be 6 ms later.

Additionally, for CC#5, the ACK/NACK transmission timing for subframe 3 is set to be 9 ms later; the ACK/NACK transmission timing for subframe 4 is set to be 8 ms later; and the ACK/NACK transmission timing for subframe 5 is set to be 7 ms later.

Additionally, for CC#6, the ACK/NACK transmission timing for subframe 3 is set to be 8 ms later; the ACK/NACK transmission timing for subframe 4 is set to be 7 ms later; and the ACK/NACK transmission timing for subframe 5 is set to be 7 ms later.

For other subframes and for all subframes of CC#7 through CC#16, the ACK/NACK transmission timings are set to be 4 ms.

In this manner, by changing the ACK/NACK transmission timings, the terminal 20 transmits 12 ACK/NACKs to the eNB 10 for subframes 2 and 7; and the terminal 20 transmits 13 ACK/NACKs to the eNB 10 for subframes 1, 3-6, 8, and 9.

Thus, it suffices if the PUCCH Payload of each subframe can store up to 13 ACK/NACKs. Consequently, for the case of performing the CA in which the FDD cells and the TDD cells coexist, the error rate for transmission of the ACK/NACKs can be suppressed.

Operation Example 3

Figure 12:
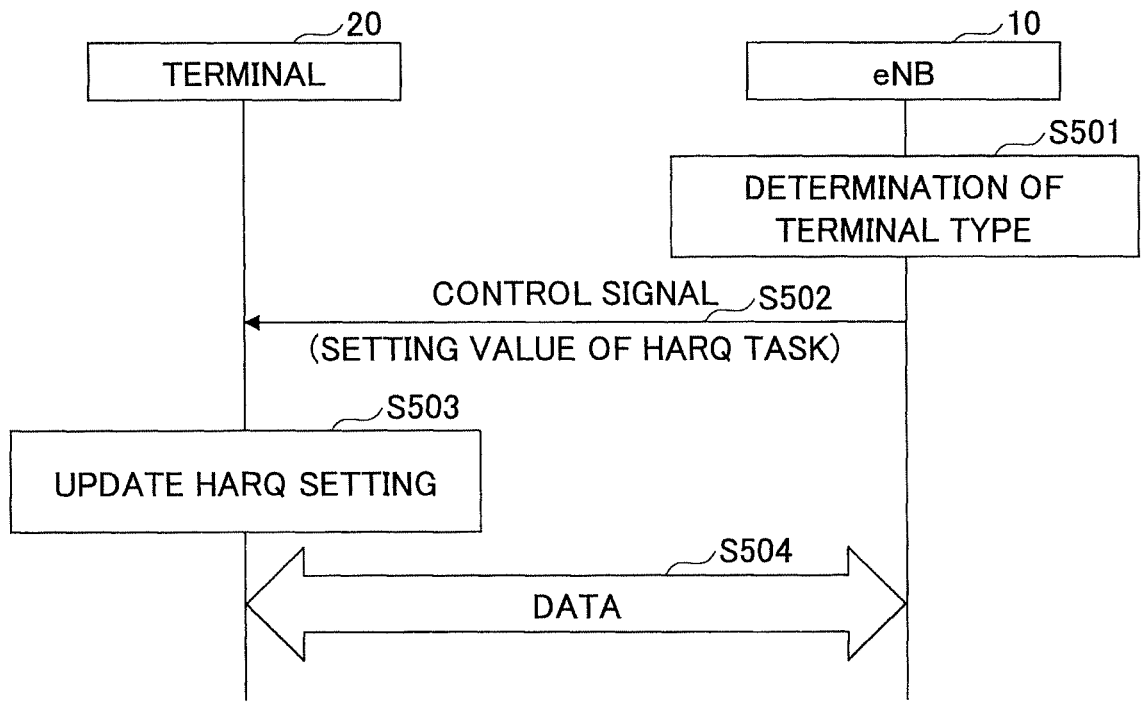
FIG. 12 is a diagram illustrating an example of a processing sequence of a processing procedure (operation example 3) according to the embodiment.

FIG. 12 is a diagram illustrating an example of a processing sequence of a processing procedure (operation example 3) according to the embodiment. By using FIG. 12, the processing procedure is described for a case where the operation of the HARQ process is changed for the terminal 20, which is used for the MTC.

At step S501, the processing method reporting unit 103 of the eNB 10 obtains the setting values of the HARQ task to be reported to the terminal 20 by referring to the terminal information stored in the setting information storage unit 104 while using the terminal type identifier (IMEI) as a key. Here, the processing method reporting unit 103 may obtain the terminal type identifier of the terminal 20 from the core network; or may obtain the terminal type identifier of the terminal 20 by another method. Here, it is assumed that, as the terminal information, the terminal information illustrated in FIG. 4B is stored; and that the terminal type identifier of the terminal 20 is 111111. In this case, the HARQ process number is 1; the ACK/NACK transmission timing is 100 s; and the HARQ RTT Timer is 200 s.

At step S502, the signal processor 102 of the eNB 10 transmits a control signal including the setting values of the HARQ task to the terminal 20. The control signal may be, for example, a signal used for the RRC protocol; a signal used for the MAC sublayer; or a signal used for the physical layer.

Further, after transmitting, to the terminal 20, the control signal including the setting values of the HARQ task at step S502, the signal processor 102 may instruct the terminal 20 to execute the intra-cell HO, so that buffers and various types of timer values maintained by the HARQ processor 201 of the terminal 20 are caused to be reset. In this case, the signal processor 102 instructs the terminal 20 in such a manner that the HO is to be executed for the cell that is the same as the cell to which the terminal 20 is currently connected.

At step S503, the processing method changing unit 203 of the terminal 20 reports, to the HARQ processor 201, the setting values of the HARQ task reported at step S502. The HARQ processor 201 of the terminal 20 updates the HARQ process number, the ACK/NACK transmission timing, and the HARQ RTT Timer, based on the reported setting values of the HARQ task.

Further, the HARQ processor 201 divides or combines buffers depending on the updated HARQ process number, so that the HARQ processes can respectively execute HARQ tasks. Furthermore, prior to starting the HARQ tasks based on the HARQ process number, the ACK/NACK transmission timing, and the HARQ RTT Timer, which are updated, the HARQ processor 201 resets buffers and various types of timer values for executing the HARQ tasks.

Here, the process for resetting the buffers and various types of timer values for executing the HARQ tasks may be executed by the HARQ processor 201 itself; or the existing operational procedure to be executed for the intra-cell HO may be applied to execute the process.

At step S504, data transmission and ACK/NACK reporting are executed between the terminal 20 and the eNB 10.

Note that, at the processing procedure at step S502, the terminal 20 may be instructed that setting values of the HARQ tasks for both uplink and downlink are to be updated. In this case, in the processing procedure at step S503, the HARQ processor 201 of the terminal 20 updates the HARQ process number, the ACK/NACK transmission timing, and the HARQ RTT Timer for both uplink and downlink.

Figure 13:
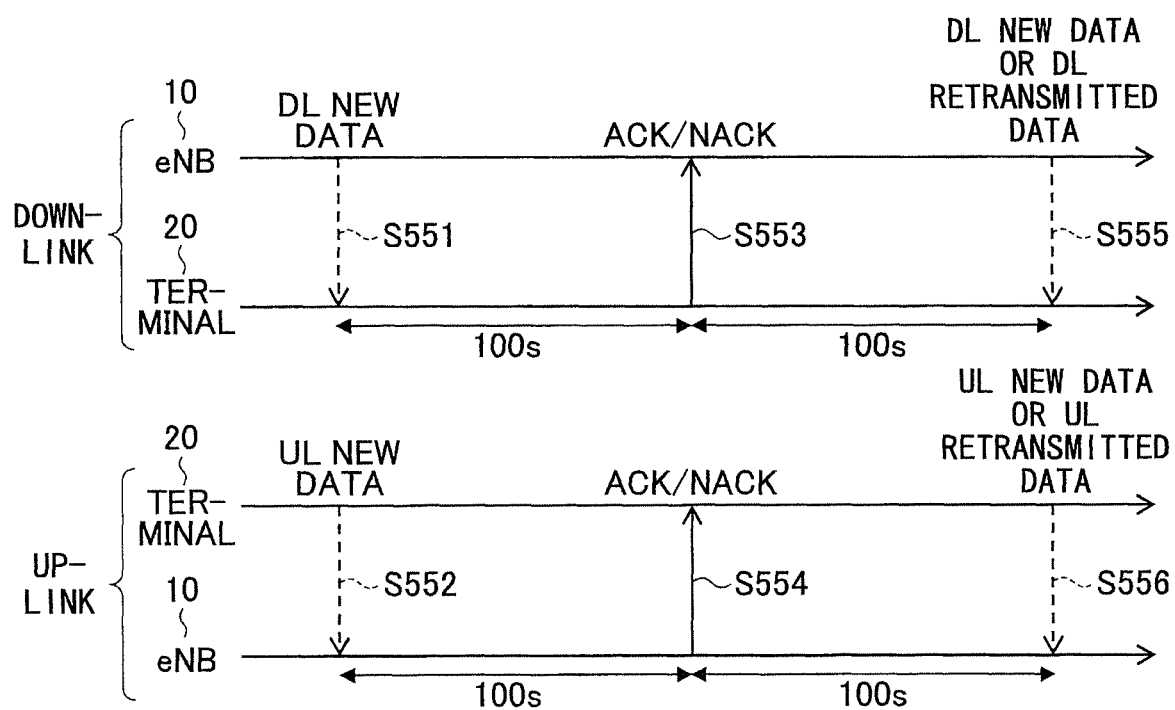
FIG. 13 is a diagram, in units of subframes, of a data flow of the processing procedure (operation example 3) according to the embodiment.

FIG. 13 is a diagram embodying, in units of subframes, a data flow of the processing procedure (operation example 3) according to the embodiment. FIG. 13 illustrates an example of a data flow for a case where the eNB 10 instructs the terminal 20 to execute the HARQ task with the HARQ process number=1 process, the ACK/NACK transmission timing=100 s, and the HARQ RTT Timer=200 s, for both uplink and downlink HARQ tasks.

First, the eNB 10 transmits downlink data to the terminal 20 (S551). At the same time, the terminal 20 transmits uplink data to the eNB 10 in the same subframe (S552). Subsequently, since the ACK/NACK transmission timing is set to 100 s, the terminal 20 returns the ACK/NACK 100 s after receiving the data at step S551. At the same time, the eNB 10, similarly, returns the ACK/NACK 100 s after receiving the data at step S552. Subsequently, since the HARQ RTT Timer is set to 200 s, the eNB 10 transmits new data or the retransmitted data to the terminal 20, 100 s after receiving the ACK/NACK at step S553 (S555). At the same time, the terminal 20, similarly, transmits new data or the retransmitted data to the eNB 10, 100 s after receiving the data at step S554.

Operation Example 3

Modified Example

Figure 14:
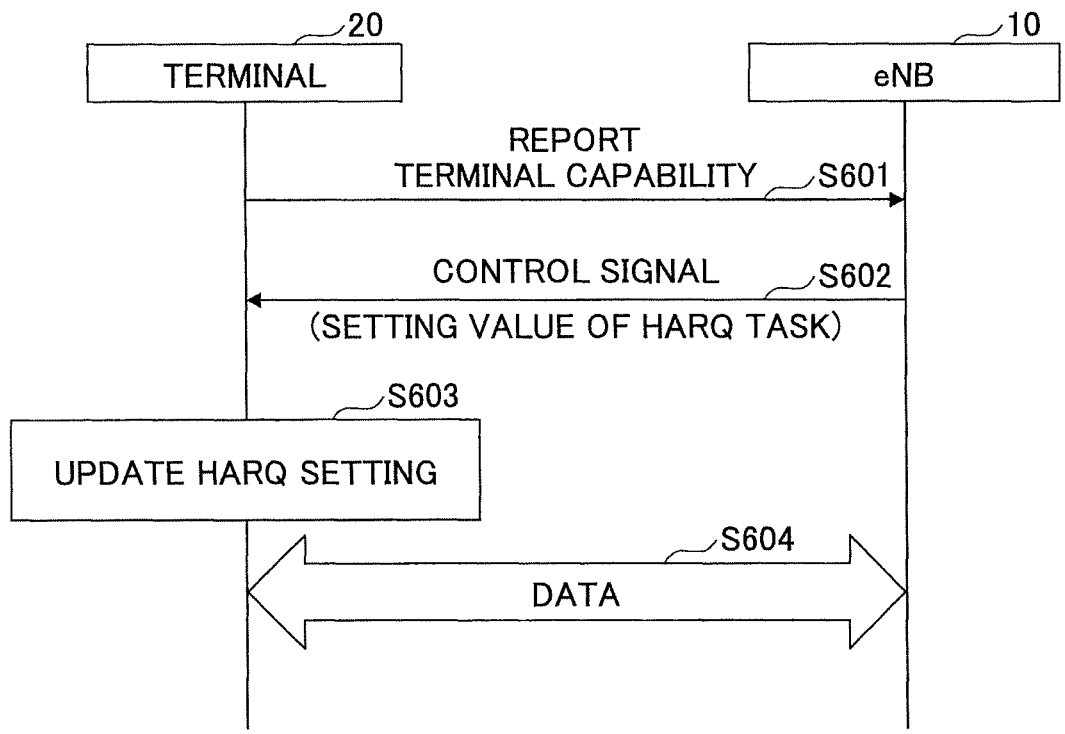
FIG. 14 is a diagram illustrating an example of a processing sequence of a processing procedure (operation example 3 (modified example)) according to the embodiment.

FIG. 14 is a diagram illustrating an example of a processing sequence of a processing procedure (operation example 3 (modified example)) according to the embodiment. In operation example 3 (modified example), the processing method reporting unit 103 of the eNB 10 determines the setting value of the HARQ task to be reported to the terminal 20, based on a terminal capability reported from the terminal 20.

At step S601, the capability reporting unit 205 of the terminal 20 reports information on a processing capability of the terminal 20 itself to the eNB 10. The capability receiver 105 of the eNB 10 receives the information on the processing capability of the terminal 20; and pass it to the processing method reporting unit 103. The processing method reporting unit 103 determines the setting values of the HARQ task based on the information on the processing capability of the terminal 20. The processing method reporting unit 103 may handle, without processing, the information on the processing capability of the terminal 20 reported at step S601 as it is, as the setting values of the HARQ task; or may determine the setting value of the HARQ task within the range of the information on the processing capability of the terminal 20 reported at step S601.

For example, suppose that, in the processing procedure at step S601, the capability reporting unit 205 of the terminal 20 reports, as the information on the processing capability of the terminal 20 itself, the HARQ process number=2; the ACK/NACK transmission timing=50 s; and the HARQ RTT Timer=100 s to the eNB 10. In this case, the processing method reporting unit 103 of the eNB 10 may set the setting values of the HARQ tasks to be reported to the terminal 20 as follows: the HARQ process number=2, the ACK/NACK transmission timing=50 s, and the HARQ RTT Timer=100 s; or the HARQ process number=1, the ACK/NACK transmission timing=100 s, and the HARQ RTT Timer=200 s.

Note that, in the processing procedure at step S601, it is not always necessary for the capability reporting unit 205 of the terminal 20 to report all the parameters (the HARQ process number, the ACK/NACK transmission timing, and the HARQ RTT Timer) to the eNB 10; but only a part of the parameters may be transmitted. In this case, the capability report receiver 105 of the eNB 10 determines, for the parameters not reported from the terminal 20, that the setting values are the same as the setting values of the existing LTE.

The processing procedures from step S602 to step S604 are the same as the processing procedures from step S502 to step S504, respectively, so that the description is omitted.

The processing procedure (operation example 3) according to the embodiment is described above. By executing the processing procedure of operation example 3, for a case where communication is performed, such as MTC, by using the terminal 20, by changing the setting values of the HARQ task of the terminal 20, the communication can be performed while suppressing the power consumption.

Operation Example 4

Figure 15:
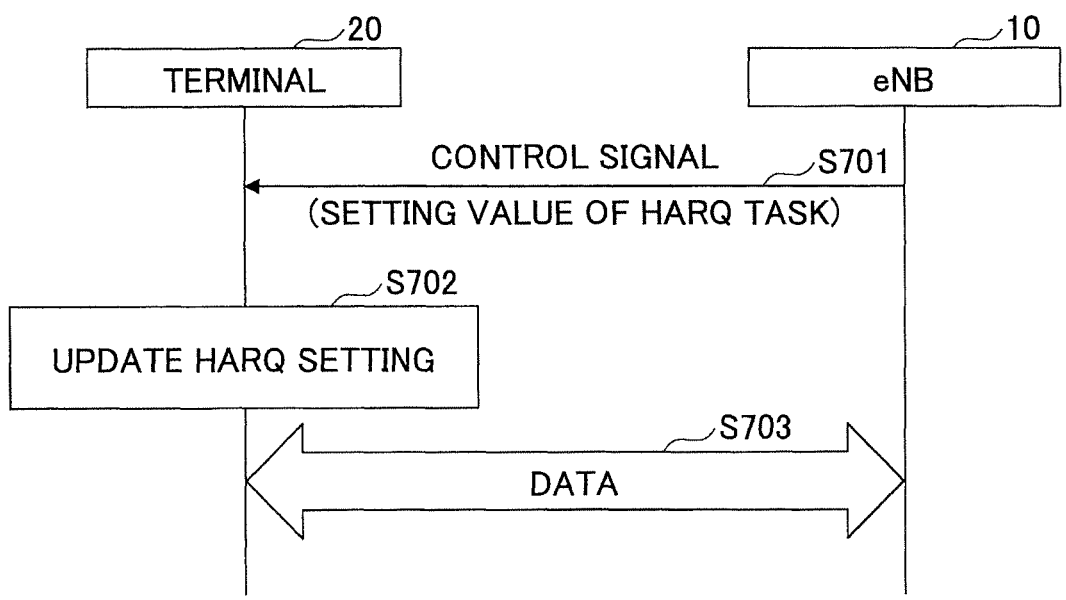
FIG. 15 is a diagram illustrating an example of a processing sequence of a processing procedure (operation example 4) according to the embodiment.

FIG. 15 is a diagram illustrating an example of a processing sequence of a processing procedure (operation example 4) according to the embodiment. By using FIG. 15, the processing procedure is described for a case where the operation of the HARQ task is changed when communication using the LAA technology is executed between the eNB 10 and the terminal 20. It is assumed, for the communication according to operation example 4, that a LTE band is used for the downlink communication; and a LAA band for the wireless LAN is used for the uplink communication.

At step S701, the processing method reporting unit 103 of the eNB 10 refers to the LAA band information in the setting information storage unit 104; and determines the setting values of the HARQ task to be reported to the terminal 20. Here, it is assumed that the LAA band information illustrated in FIG. 4D is stored as the LAA band information. In this case, 10 is retrieved as the HARQ process number; 4 ms is retrieved as the ACK/NACK transmission timing; and 8 ms is retrieved as the HARQ RTT Timer.

Subsequently, the signal processor 102 of the eNB 10 transmits a control signal including the setting values of the HARQ task to the terminal 20. The control signal may be, for example, a signal used for the RRC protocol; a signal used for the MAC sublayer; or a signal used for the physical layer.

Further, after transmitting, to the terminal 20, the control signal including the setting values of the HARQ task at step S702, the signal processor 102 may instruct the terminal 20 to execute the intra-cell HO, so that buffers and various types of timer values maintained by the HARQ processor 201 are caused to be reset. In this case, the signal processor 102 instructs in such a manner that the HO is to be executed to the cell that is the same as the cell to which the terminal 20 is currently connected.

The processing procedure at step S702 is the same as that of step S503, so that the description is omitted.

At step S703, data transmission and ACK/NACK reporting are executed between the eNB 10 and the terminal 20.

Figure 16:
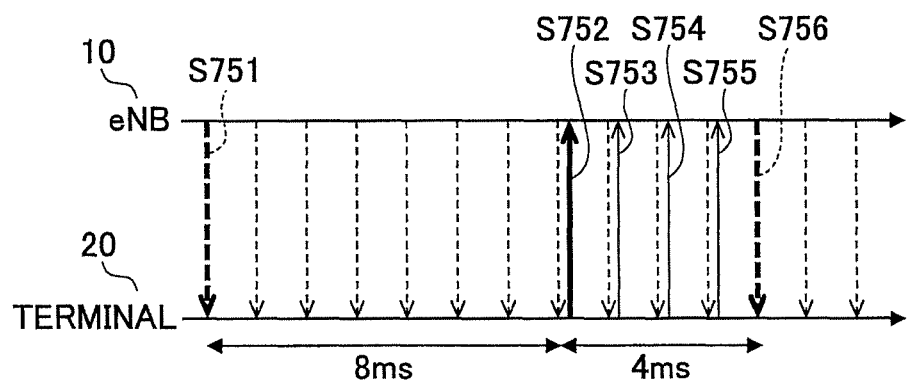
FIG. 16 is a diagram, in units of subframes, of a data flow of the processing procedure (operation example 4) according to the embodiment.

FIG. 16 is a diagram embodying, in units of subframes, a data flow of the processing procedure (operation example 4) according to the embodiment. FIG. 16 illustrates an example of a data flow for a case where the eNB 10 instructs the terminal 20 to execute the HARQ tasks with the HARQ process number=12 processes, the ACK/NACK transmission timing=4 ms, and the HARQ RTT Timer=12 ms. Here, in the example of FIG. 16, it is assumed that, for the uplink communication using the LAA band, communication can be performed only for 4 ms (4 subframes) in which no other communication is performed.

The terminal 20 confirms whether no other communication is performed, 4 ms after receiving the data from the eNB 10 (S751). In the example of FIG. 16, it is assumed that the other communication is performed 4 ms after step S751; and that the state transitions to a state where no other communication is performed, 8 ms after that.

Subsequently, the terminal 20 transmits 4 ACK/NACKs (S752, S753, S754, and S755). Subsequently, since the HARQ RTT Timer is 12 ms, the eNB 10 transmits new data or the retransmitted data to the terminal 20 (S756), 12 subframes after transmitting the data to the terminal 20 (S751).

Here, since the HARQ process number at the side of the terminal 20 is set to 12, the eNB 10b can transmit any other data to the terminal 20 within the interval of 11 subframes from transmitting the data to the terminal 20 at step S751 until transmitting the new data or the retransmitted data to the terminal 20 at step S756.

As in this operation example, when the LAA band is used for the uplink communication, the time period in which the ACK/NACK can be transmitted is to be limited. Thus, by increasing the HARQ process number, a plurality of data items can be continuously transmitted without waiting for reception of the ACK/NACK.

Operation Example 4

Modified Example

When the LAA band is used for the uplink communication, the time period in which the ACK/NACK can be transmitted is to be limited. Thus, a plurality of ACK/NACKs may be included in a single subframe, so that it is transmitted to the eNB 10.

Figure 17:
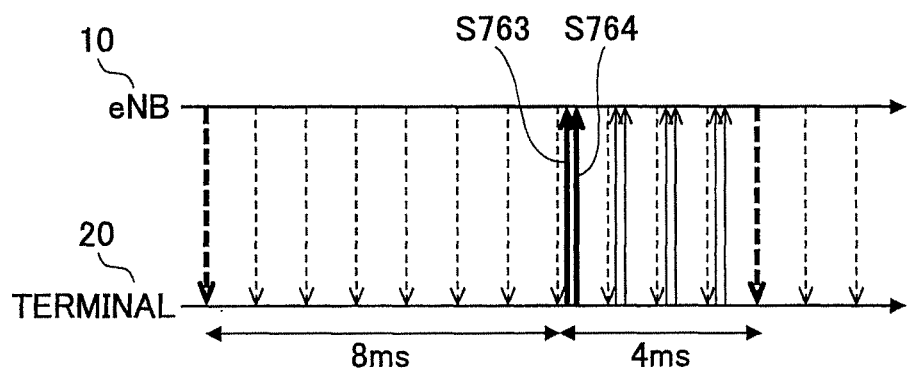
FIG. 17 is a diagram, in units of subframes, of a data flow of a processing procedure (operation example 4 (modified example)) according to the embodiment.

FIG. 17 is a diagram embodying, in units of subframes, a data flow of the processing procedure (operation example 4 (modified example)) according to the embodiment.

FIG. 17 illustrates a flow of data for a case where a plurality of ACK/NACKs are included in a single subframe in uplink.

For example, the HARQ processor 201 of the terminal 20 includes two ACK/NACKs in a single subframe, and transmits it to the eNB 10 (S763, S764). In this manner, even if the LAA band is used for the uplink, communication can be efficiently performed by including the plurality of ACK/NACKs in the single subframe.

<Effect>

As described above, in the communication system according to the embodiment, eNB 10 is allowed to voluntarily change operation of the HARQ task by specifying the setting values of the HARQ task to the terminal 20. Consequently, the communication system according to the embodiment is able to flexibly change the setting for the HARQ task to be executed between the eNB 10 and the terminal 20, so that suitable HARQ tasks can be executed for various types of communication methods, respectively, regardless of the network setting and the type of the terminal 20.

Further, in the communication system according to the embodiment, the terminal 20 is allowed to report the processing capability of the terminal 20 itself to the eNB 10; and the eNB 10 is allowed to voluntarily change the operation of the HARQ task based on the processing capability of the terminal 20. Consequently, the communication system according to the embodiment is able to flexibly change the setting for the HARQ task to be executed between the eNB 10 and the terminal 20 based on the processing capability of the terminal 20, so that suitable HARQ tasks can be executed for various types of communication methods, respectively, regardless of the network setting and the type of the terminal 20.

Further, in the communication system according to the embodiment, the HARQ process number, the ACK/NACK transmission timing, and the HARQ RTT Timer are allowed to be voluntarily changed, as the setting values of the HARQ task. Consequently, the communication system according to the embodiment is able to change the operation of the HARQ task in various ways.

Further, in the communication system according to the embodiment, the terminal 20 is allowed to report, to the eNB 10, the maximum number of the HARQ process number that can be processed (can be maintained) by the terminal 20 itself; the minimum value of the ACK/NACK transmission timing that can be supported by the processing capability of the terminal 20 itself; and the minimum value of the HARQ RTT Timer that can be supported by the processing capability of the terminal 20 itself, as the processing capability of the terminal 20 itself. Consequently, the communication system according to the embodiment is able to change the operation of the HARQ task in various ways, based on the processing capability of the terminal 20.

Further, in the communication system according to the embodiment, upon detecting that the setting values of the HARQ task are updated, the terminal 20 deletes buffers used for the HARQ task, and resets various types of timer values. Further, the terminal 20 deletes the buffers used for the HARQ task and resets the various types of timer values by forcing the existing process, such as the intra-cell HO or deactivation of the SCell, to be executed. In this manner, when the setting values of the HARQ task are updated, the communication system according to the embodiment is able to eliminate the adverse effect caused by old data, and absolutely change the operation of the HARQ task.

Further, in the communication system according to the embodiment, the HARQ task for the downlink communication and the HARQ task for the uplink communication are allowed to be independently changed. Consequently, the communication system according to the embodiment is able to efficiently execute downlink and uplink communication, regardless of the network setting and the type of the terminal 20.

Furthermore, in the communication system according to the embodiment, the terminal 20 is allowed to maintain various types of information related to the setting values of the HARQ task; and the eNB 10 is allowed to report, to the terminal 20, only the information for specifying the setting values of the HARQ task. Consequently, even if the setting values of the HARQ task are complicated, the communication system according to the embodiment is able to change the operation of the HARQ task, without increasing the data amount of the control signal.

<Supplement to the Embodiment>

In the above-described embodiment, the timing for the eNB 10 to update the setting values of the HARQ task is not limited to the cases described in operation example 1 through 4. The eNB 10 may update the setting values of the HARQ task at any timing.

In the above-described processing procedures of the embodiment, the setting values of the HARQ task to be specified by the eNB 10 to the terminal 20 may not include all the parameters (the HARQ process number, the ACK/NACK transmission timing, and the HARQ RTT Timer). Since these parameters are defined, in advance, by the specification of the LTE, only a parameter that is required to be updated may be reported.

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional configuration diagrams may not necessarily correspond to a boundary of a physical component. An operation by a plurality of functional units may be physically executed by a single component, or an operation of a single functional unit may be physically executed by a plurality of components.

All of or a part of the above-described embodiment may be implemented by a program. The program may be stored in a random access memory (RAM), a flash memory, a read-only memory (ROM), an EPROM, an EEPROM, a resister, a hard disk (HDD), a removable disk, a CD-ROM, a database, a server, or any other suitable storage medium.

Note that, in the embodiment, the eNB 10 is an example of the base station apparatus. The HARQ process is an example of the error correction process. The setting values of the HARQ task is an example of the instruction information. The processing method changing unit 203 is an example of the receiver. The HARQ processor 201 is an example of the processor. The capability reporting unit 205 is an example of the reporting unit. The HARQ RTT Timer is an example of a timer value representing a time period from receiving a signal until receiving the retransmitted signal. The ACK/NACK transmission timing is an example of a time period from receiving a signal until transmitting a reception response. In the CA information of FIG. 4C, Type A or Type B is an example of the information for instructing an operation pattern of the error correction process.

This patent application is based upon and claims the benefit of priority of Japanese Patent Application No. 2015-015998 filed on Jan. 29, 2015, and the entire contents of which are incorporated herein by reference.

LIST OF REFERENCE SYMBOLS

10: eNB
20: terminal
101, 201: HARQ processor
102, 202: signal processor
103: processing method reporting unit
104, 204: setting information storage unit
105: capability information receiver
203: processing method changing unit
205: capability reporting unit
301: RF module
302: BB processing module
303: device control module
304: communication IF
401: RF module
402: BB processing module
403: UE control module

The invention claimed is:

1. A terminal for communicating with a base station apparatus, the terminal comprising:
   a receiver that receives, from the base station apparatus, a control signal used for Radio Resource Control (RRC) protocol or for a physical layer, and receives a data signal from the base station apparatus, wherein the control signal comprises setting values for an error correction process;
   a processor that updates a time from a reception of the data signal until a transmission of a response to the reception of the data signal, the time being updated based on the control signal; and
   a transmitter that transmits, to the base station apparatus, the reception response at the updated time after receiving the data signal from the base station apparatus.

2. The terminal according to claim 1, wherein the transmitter further transmits terminal capability information of the terminal to the base station apparatus so as to cause the base station apparatus to determine an operation of the error correction process.

3. The terminal according to claim 2, wherein the terminal capability information includes an upper limit value of a process number that is able to be maintained by the terminal, the process number being a number of the processes to be used for the error correction process.

4. The terminal according to claim 3, wherein, upon detecting that a number of signals received from the base station apparatus exceeds the upper limit value the processor discards the signals received from the base station apparatus.

5. A communication system comprising:
   a base station apparatus; and
   a terminal,
   wherein the base station apparatus includes:
      a transmitter that transmits to the terminal, a control signal used for Radio Resource Control (RRC) protocol or for a physical layer, and transmits a data signal to the terminal, wherein the control signal comprises setting values for an error correction process; and
      a receiver that receives, from the terminal, a reception response at an updated time after transmitting the data signal to the terminal, and
   wherein the terminal includes:
      a receiver that receives, from the base station apparatus, the control signal comprising the setting values and being used for the RRC protocol or for the physical layer, and receives the data signal from the base station apparatus; and
      a processor that updates a time from a reception of the data signal until a transmission of a response to the reception of the data signal, the time being updated based on the control signal; and a transmitter that transmits, to the base station apparatus, the reception response at the updated time after receiving the data signal from the base station apparatus.

* * * * *